(12) United States Patent
Akhter et al.

(10) Patent No.: US 8,842,721 B1
(45) Date of Patent: Sep. 23, 2014

(54) METHOD AND APPARATUS FOR CHANNEL EQUALIZATION IN HIGH SPEED S-RIO BASED COMMUNICATION SYSTEMS

(75) Inventors: Mohammad Shahanshah Akhter, Ottawa (CA); Barry Everett Wood, Dunrobin (CA); Randy May, Ottawa (CA)

(73) Assignee: Integrated Device Technology, Inc., San Jose, CA (US)

( * ) Notice: Subject to any disclaimer, the term of this patent is extended or adjusted under 35 U.S.C. 154(b) by 313 days.

(21) Appl. No.: 13/244,599

(22) Filed: Sep. 25, 2011

(51) Int. Cl.
H03H 7/30 (2006.01)

(52) U.S. Cl.
USPC .......................................................... 375/233

(58) Field of Classification Search
USPC .......................................................... 375/233
See application file for complete search history.

(56) References Cited

U.S. PATENT DOCUMENTS

| 5,742,642 | A * | 4/1998 | Fertner | 375/233 |
|---|---|---|---|---|
| 8,406,285 | B1 * | 3/2013 | Diukman | 375/233 |
| 2002/0181573 | A1 * | 12/2002 | Dohmen et al. | 375/229 |
| 2004/0268190 | A1 * | 12/2004 | Kossel et al. | 714/704 |
| 2005/0134306 | A1 * | 6/2005 | Stojanovic et al. | 326/31 |
| 2006/0008279 | A1 * | 1/2006 | Chiang et al. | 398/202 |
| 2006/0188043 | A1 * | 8/2006 | Zerbe et al. | 375/346 |
| 2009/0052515 | A1 * | 2/2009 | Webb et al. | 375/232 |
| 2011/0305271 | A1 * | 12/2011 | Zerbe et al. | 375/232 |
| 2011/0310949 | A1 * | 12/2011 | Zerbe et al. | 375/229 |
| 2012/0044984 | A1 * | 2/2012 | Zerbe et al. | 375/233 |
| 2012/0207196 | A1 * | 8/2012 | Zerbe et al. | 375/219 |
| 2012/0207204 | A1 * | 8/2012 | Hidaka | 375/233 |

OTHER PUBLICATIONS

Haunstein, "Control of combined electrical feed-forward and decision feedback equalization by conditional error counts from FEC in the presence of PMD," OFC 2003 Optical Fiber Communications Conference, Publication Year: 2003 , pp. 474-476 vol. 2.*
RapidIO™ Interconnect Specification, Rev. 2.1, Aug. 2009, RapidIO Trade Association, 12343 Hymeadow, Suite 2-R, Austin, TX 78750 Tel. 512-401-2900.

* cited by examiner

*Primary Examiner* — Juan A Torres
(74) *Attorney, Agent, or Firm* — Heimlich Law, PC; Alan Heimlich, Esq.

(57) ABSTRACT

A Method and Apparatus for Channel Equalization in High Speed S-RIO based Communication Systems have been disclosed. By adjusting equalizer coefficients based on 8B10B error counts and an error threshold, a receiver may be dynamically adjusted. By adjusting transmitter pre-emphasis based on 8B10B error counts and an error threshold, a transmitter may be dynamically adjusted. Both the transmitter and receiver may be adjusted dynamically based on 8B10B error counts and different error thresholds.

4 Claims, 23 Drawing Sheets

1. A method comprising:
    measuring an error rate on a serial link;
    comparing said error rate to a error threshold; and
    when said error rate is above said threshold:
        adjusting transmitter pre-emphasis coefficients;
        adjusting receiver decision feedback equalization settings.

2. The method of claim 1 wherein said serial link is an S-RIO link and said measuring an error rate is measuring an 8B10B error rate.

3. The method of claim 2 wherein said adjusting transmitter pre-emphasis coefficients is performed in several steps dynamically based on said measured error rate.

4. The method of claim 2 wherein said adjusting receiver decision feedback equalization settings is performed in several steps dynamically based on said measured error rate.

5. The method of claim 2 wherein said adjusting transmitter pre-emphasis coefficients and said adjusting receiver decision feedback equalization settings are performed in several steps dynamically based on said measured error rate.

6. The method of claim 5 wherein said measuring, said comparing, and said adjusting transmitter and receiver are performed on a plurality of lanes and ports.

7. The method of claim 5 wherein said transmitter pre-emphasis coefficients are adjusted by a mechanism, said mechanism powering up only when said error rate is above said threshold.

8. The method of claim 5 wherein said receiver decision feedback equalization settings are adjusted by a mechanism, said mechanism powering up only when said error rate is above said threshold.

9. The method of claim 1 wherein said serial link is an S-RIO link and said measuring an error rate is measuring a cyclic redundancy code error rate.

10. The method of claim 1 wherein said serial link is an S-RIO link and said measuring an error rate is measuring a protocol error rate.

11. A method for adjusting decision feedback equalization (DFE) coefficients comprising:
    (a) scanning said DFE coefficients;
    (b) monitoring 8B10B errors;
    (c) comparing said 8B10B errors against a target error count;
    (d) going to step (b) when said 8B10B errors are below said target error count;
    (e) adjusting said DFE coefficients based on said target error count;
    (f) going to step (b).

12. The method of claim 11 further comprising:
    (a1) scanning a transmitter pre-emphasis coefficients;
    (e1) adjusting said transmitter pre-emphasis coefficients based on said target error count.

FIG. 15

13. An apparatus comprising:
    means for determining a receiver decision feedback equalization coefficients;
    means for monitoring errors at said receiver;
    means for receiving an error threshold; and
    means for adjusting said receiver decision feedback equalization coefficients.

14. The apparatus of claim 13 wherein:
    means for monitoring errors at said receiver are means for monitoring 8B10B errors at said receiver.

15. The apparatus of claim 13 further comprising:
    means for determining a transmitter pre-emphasis coefficients; and
    means for adjusting said transmitter pre-emphasis coefficients.

16. The apparatus of claim 13 further comprising:
    means for powering up said means for adjusting said receiver decision feedback equalization coefficients only when adjusting said receiver decision feedback equalization coefficients; and
    means for powering down said receiver decision feedback equalization coefficients when not adjusting said receiver decision feedback equalization coefficients.

17. The apparatus of claim 15 further comprising:
    means for powering up said means for adjusting said transmitter pre-emphasis coefficients only when adjusting said transmitter pre-emphasis coefficients; and
    means for powering down said means for adjusting said transmitter pre-emphasis coefficients when not adjusting said transmitter pre-emphasis coefficients.

18. The apparatus of claim 17 wherein said means for receiving said error threshold is means for receiving a dynamically variable error threshold.

19. The apparatus of claim 18 wherein said dynamically variable error threshold is at a time selected from the group consisting of at a power up, at a fixed time interval, at a time based on said monitored errors at said receiver, at a time determined by said transmitter, and at a time determined by a computer program.

20. The apparatus of claim 13 wherein:
    means for monitoring errors at said receiver are selected from the group consisting of means for monitoring cyclic redundancy code errors, means for monitoring protocol errors, means for monitoring 64B/67B errors at said receiver, and means for monitoring cyclic redundancy code errors and means for monitoring protocol errors and means for monitoring 8B/10B errors at said receiver.

FIG. 16

METHOD AND APPARATUS FOR CHANNEL EQUALIZATION IN HIGH SPEED S-RIO BASED COMMUNICATION SYSTEMS

FIELD OF THE INVENTION

The present invention pertains to channel equalization. More particularly, the present invention relates to a Method and Apparatus for Channel Equalization in High Speed S-RIO based Communication Systems.

BACKGROUND OF THE INVENTION

The technical matter discussed herein is highly specialized and technically detailed in nature. One skilled in the art is familiar with this technology, the terminology, and the specifications for such. For those unfamiliar with the technology and the terminology an excellent starting point is the publicly available standards which may be found at http://www.rapidio.org/home. The RapidIO Specification 2.1 is a good standard to review as it is succinct in nature and easily understood by one of skill in the art, and is hereby incorporated by reference.

Error rate plays one of the most important roles in quantifying overall system performance in communication systems. In particular in RapidIO based products for long-reach serial links running at or higher than 6.25 Gbaud it is very important.

Gigahertz signaling rates require multiple disciplines for successful operation, including careful attention to board layout, clocking, and power. The S-RIO (serial rapid input output) Gen-2 switches (also denoted sRIO Gen2 Switch) can achieve bit error rates of 1E-15 using default transmit pre-emphasis and receive equalization coefficient settings over short- and medium-reach channels, as defined by the RapidIO Specification (Rev. 2.1), Part 6 (referred to ad Gen 2 standard).

For long reach (100 cm) channels with link rate higher than 5 GBaud (for example, 6.25 GBaud or higher long-reach channel) the received signal degrades significantly due to ISI (inter symbol interference) resulting from excessive reflection, attenuation and channel delay. In addition, channel imperfections may vary over time due to changes in temperature and voltage and the fixed coefficient settings are not sufficient to compensate for these various imperfections. This presents a technical problem which needs a technical solution.

BRIEF DESCRIPTION OF THE DRAWINGS

The invention is illustrated by way of example and not limitation in the figures of the accompanying drawings in which:

FIG. 15 illustrates, generally at 1500, various embodiments of the invention.

FIG. 16 illustrates, generally at 1600, various embodiments of the invention.

DETAILED DESCRIPTION

Figure 1:
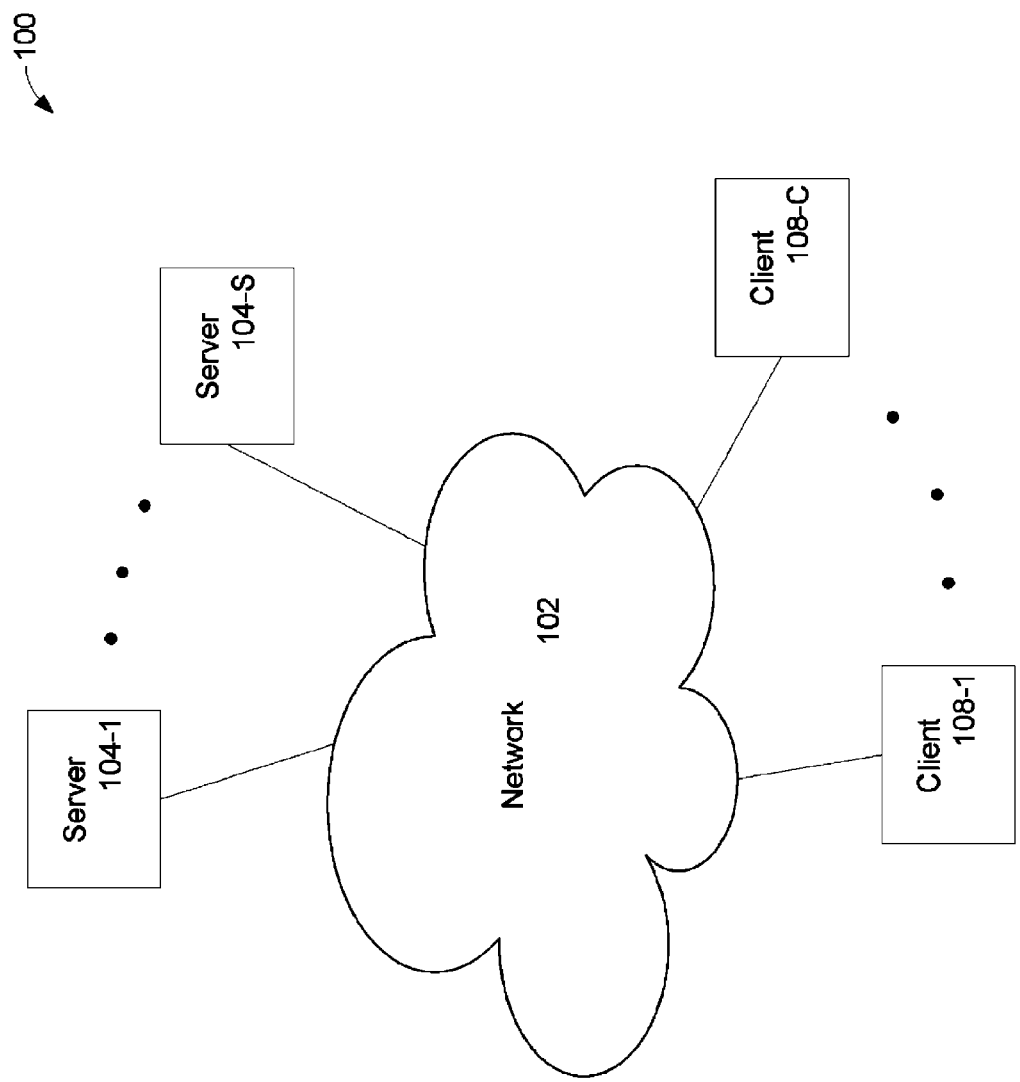
FIG. 1 illustrates a network environment in which the method and apparatus of the invention may be implemented.

In one embodiment of the invention, using the disclosed techniques an improved signal quality in high-speed serial links RapidIO based products for long-reach serial links running at or higher than 6.25 Gbaud is possible.

In one embodiment of the invention, a technique is comprised of three steps and provides a way to perform automatic scanning to find preliminary good tap settings. The technique relies on 8B10B error metric to adjust transmit pre-emphasis coefficients and decision feedback equalization settings to improve link performance. Adaptive adjustment is performed in several steps dynamically based on flexible error metric thresholds and observation window.

In one embodiment of the invention, with a technique disclosed it is possible to improve system performance based on an error code metric inherent to S-RIO (serial rapid input output) protocol and improve high speed link quality through step-by-step process adaptively. Several implementation approaches based on hardware and embedded processor are also disclosed.

In one embodiment of the invention, improving the signal quality is done by altering the transmit and/or receive Serializer/Deserializer (SerDes or SERDES) coefficients.

In one embodiment of the invention, is provided an overall method to adjust the coefficients starting from initial settings to final settings and to identify intermediate settings through automatic adaptation.

In one embodiment of the invention, ADFE (Adaptive Decision Feedback Equalization) may be performed using a LMS (Least Mean Square) (or sign LMS) approach purely in hardware as part of a SERDES.

In one embodiment of the invention, equalization is implemented based on error rate in hardware.

In one embodiment of the invention, equalization uses an on-die-scope to optimize the link performance.

In various embodiments of the invention, specific transmitter and receiver equalization algorithms are disclosed as well as a coefficient calculation method, a receiver equalizer adaptation method, a method to identify initial settings for the equalizer coefficients, and equalization adaptation and coefficient settings for all lanes and ports.

In one embodiment of the invention support is provided for a scalable algorithm with a hybrid architecture.

In one embodiment of the invention a high precision analog correction circuit is utilized.

In one embodiment of the invention a flexible equalization algorithm and coefficient calculation is performed.

In one embodiment of the invention coefficient calculation through scanning and monitoring using an on or off-chip CPU (central processing unit) is disclosed.

In one embodiment of the invention the techniques disclosed are scalable across technology nodes. That is, scalable across simpler or complex S-RIO switches with different number of port counts.

In one embodiment of the invention reduced power consumption is achieved by having coefficient updates and adjustments occur only when an error is identified and a correspondingly error rate is changed with respect to expected error rate.

In one embodiment of the invention reduced power consumption is achieved by activating appropriate circuits (e.g., adjust coefficient could be deactivated until error is found for all lanes/ports) only when errors are identified and an update is needed.

In one embodiment of the invention reduced power consumption is achieved by having lanes and ports that do not require coefficient updates to power down coefficient update functions and run only the error monitoring functions.

In various embodiments of the invention there is provided a flexible design with a complete solution applicable to serial link optimization. For example, there are three distinct states to 1) scan, 2) monitor, and 3) adjust the coefficients. It supports both single and multi-lane multi-gigabit ports. It provides a technique to Identify good coefficient settings for the equalizer. The equalizer coefficients are adjusted based on the 8B10B error count and thresholds. Use is made of the protocol specific 8B10B coding available within the S-RIO PHY (physical) data-path, so little to no additional encoding and decoding logic is required.

In one embodiment of the invention it provides more accurate reflection of the system performance based on an Error Metric. For example, asymmetry in eye opening, timing jitter, voltage noise in the system are all reflected in the Error metric.

In one embodiment of the invention there are multiple error metric thresholds for receiver and transmitter tap adaptation.

In one embodiment of the invention there are flexible step sizes in scan and monitor depending on the adaptation time constant.

In one embodiment of the invention there are dynamic updates to the taps to meet a target error rate.

In one embodiment the invention may be implemented entirely in hardware with a static initial configuration. The overall algorithm may be implemented in hardware based on FSMs (finite state machines). Error counter, error statistics, etc. are implemented in hardware.

In one embodiment the invention link quality improvement is based on: (1) a comprehensive signal quality optimization technique through (a) scanning, (b) monitoring (c) adjustment; (2) Relying on error rate and flexible error threshold and; (3) Relying on error measurement techniques.

In one embodiment the invention may be implemented partly in SW (software) in an embedded processor with some critical hardware accelerator. For example, an embedded processor may be integrated in an ASIC (application specific integrated circuit) to implement the overall algorithm based on the registers and interrupts from hardware accelerators. Error counter, error statistics, etc. are implemented in hardware.

In one embodiment the invention may be implemented primarily in SW with few hardware accelerators. Use error counter in hardware and use error count registers in hardware. In software is the overall algorithm to monitor and adjust.

In one embodiment of the invention there is a reduced implementation complexity because the complexity of the overall techniques is much lower than sign-LMS as it does not require any multiplication.

In one embodiment of the invention, Error Rates in S-RIO links are measured using invalid CRC or protocol errors (for example a protocol error may occur when a 10-bit data code group is received within IDLE1 sequence). In the CRC based method it is not possible to determine which lane of a multi-lane port is responsible for the transmission error that caused the CRC check to fail. In protocol error based method it is not possible to determine which lane of a multi-lane port is responsible for the transmission error that caused the protocol error. In S-RIO system each 8 bits of data is sent using a 10-bit code. Single-bit transmission errors always result in detection of at least one invalid 10-bit code group. In one embodiment the present invention relies on invalid 10-bit code group. Invalid 10-bit code groups are counted for each lane in the LANE_n_STATUS 0 CSR.8B10B DECODE ERROR field. To determine the rate of invalid 10-bit code group reception, read the LANE_n_STATUS_0_CSR.8B10B DECODE ERROR field repeatedly for a time period that corresponds to the bit error rate expected. For example, if the expected BER is 1E-12 for a 6.25 GBaud link, it is necessary to read the LANE_n_STATUS_0_CSR.8B10B DECODE ERROR after at least 160 seconds has passed. The more often the register is read in this interval, the higher the maximum bit error rate that can be measured. The method can be used for either 1× ports or multi-lane (2×, 4×) ports. Either a per-lane or per-port error detection mechanism can be used to measure signal quality for 1× ports. Per-port error detection mechanisms are preferred for 1× ports because they can count errors that may go undetected by the per-lane detection mechanisms.

Per-lane error detection mechanisms can be used to diagnose signal quality for multi-lane (2×, 4×) ports. The lane that caused a per-port error cannot be determined, so per-lane error detection mechanisms must be used. Per port error detection mechanisms can be used to determine the aggregate signal quality for a multi-lane port.

The overall approach relies on three phases: scanning, monitoring, and adjustment. Error rate related to invalid 10-bit code group is used as the metric to improve received signal quality by identifying initial coefficient settings for transmitter and for the receive decision feedback equalizer. It is possible to scan either or both transmit and receive coefficient settings. It is also possible to adjust either or both transmit and receive coefficients to adapt to slow channel variation. The monitoring relies on a leaky bucket algorithm. It is possible to control the overall convergence time and to identify optimal coefficient settings by using flexible error thresholds and variable step size used in various phases.

Figure 3:
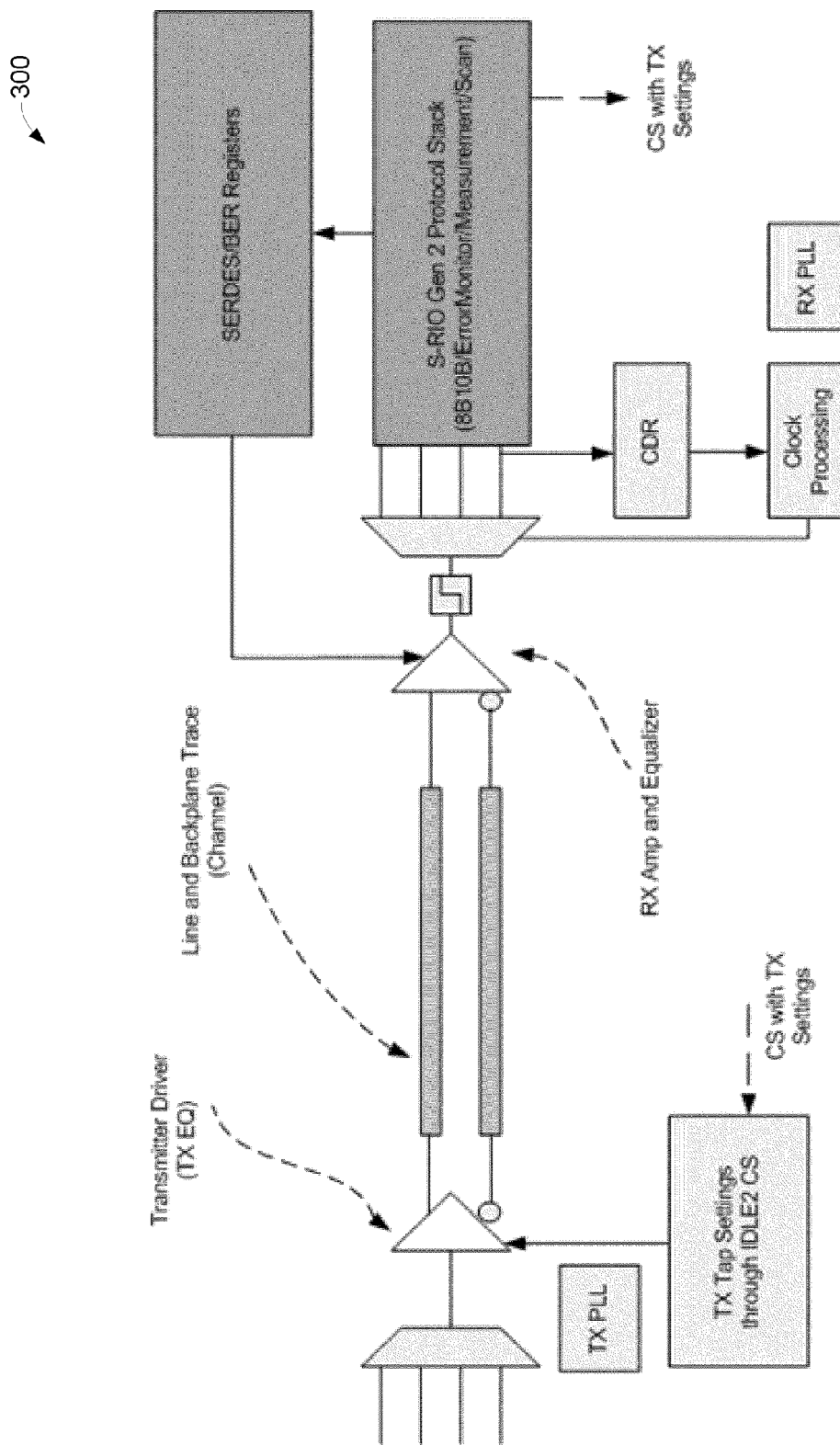
FIG. 3 illustrates, generally at 300, one embodiment of the invention showing major component blocks and functions.

FIG. 3 illustrates, generally at 300, one embodiment of the invention showing major component blocks and functions. As may be seen the overall architecture is quite different from a traditional approach which examines the RX (Receiver) Amp (Amplifier) and Equalizer output for errors performs DFE (decision feedback equalization) and then feeds back to the RX. Here a protocol stack feeds the SERDES/BER (bit error rate) Register which then feeds back to the RX.

Figure 4:
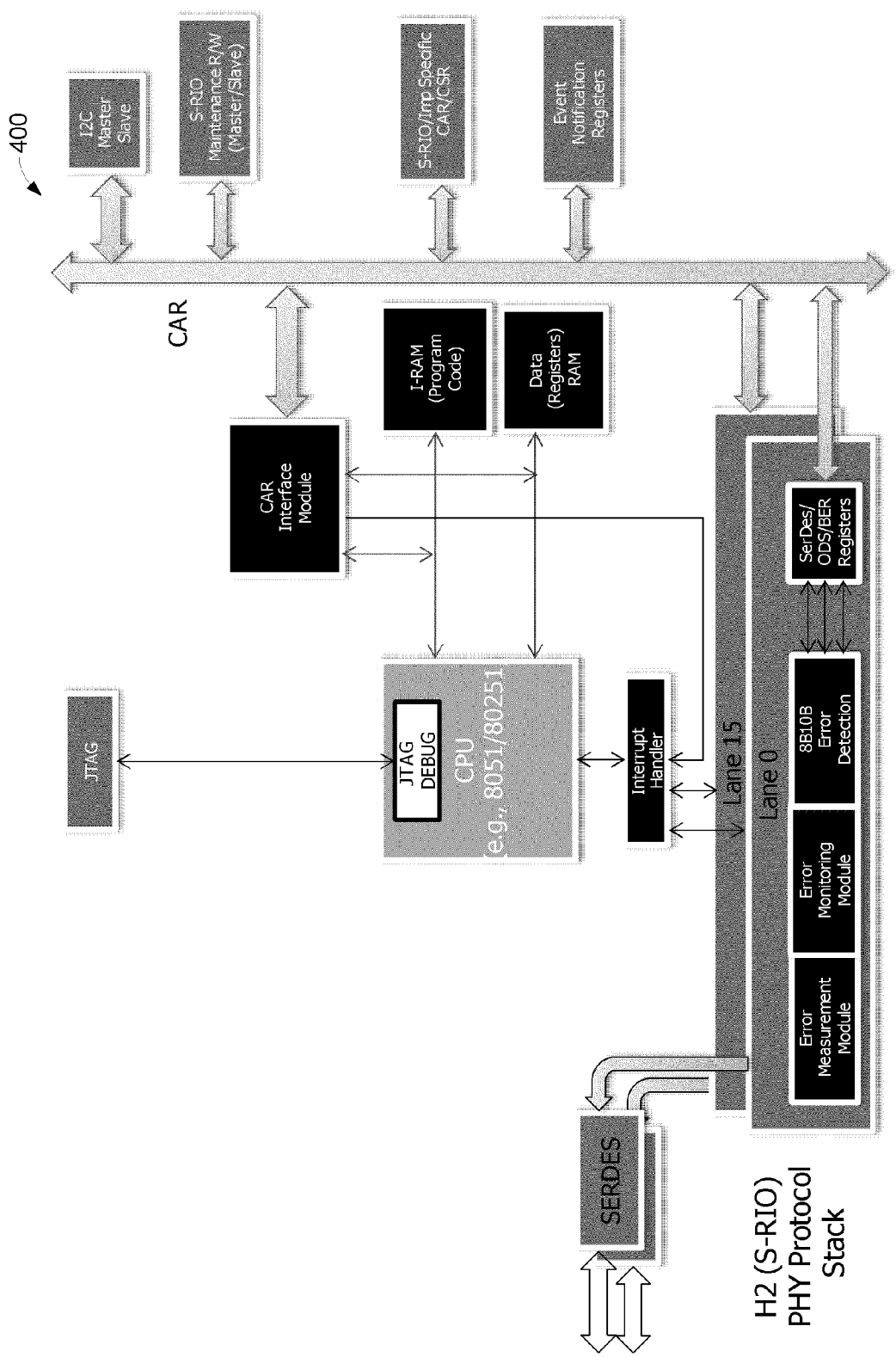
FIG. 4 illustrates, generally at 400, one embodiment of the invention showing major component blocks and functions.

FIG. 4 illustrates, generally at 400, one embodiment of the invention showing major component blocks and functions. In one embodiment hardware FSMs monitor various states and identify coefficient. In another embodiment, an embedded CPU may be used with proper programming in place of the FSMs. In another embodiment an external CPU may be used and communication using S-RIO messaging. FIG. 4 illustrates an example of an implementation using an embedded CPU.

In one embodiment of the invention based on an embedded CPU based ADFE (adaptive DFE) Implementation there are lane level modules (HW modules), 8B10B error detection/reporting, an error measurement module, an error monitoring module, SERDES ODS/BER registers, event log registers, an interrupt handler. A CPU sub-system may have the CPU (embedded or external), RAM (random access memory), a CAR (capability register) interface module, and FSMs (Scanning, Monitoring, Adjustment in SW).

In one embodiment of the invention based on HW (hardware) for example, an RTL (register-transfer level) model only ADFE Implementation, there are lane level modules for 8B10B error detection/reporting, an error measurement module, an error monitoring module, SERDES ODS/BER registers, event log registers, and BER/ODS control and status registers. For the lane level FSM there is a scanning/monitoring FSM, a RX tap adjustment FSM, a TX (transmitter) TAP (tap) adjustment FSM, and master BER FSM.

Figure 5:
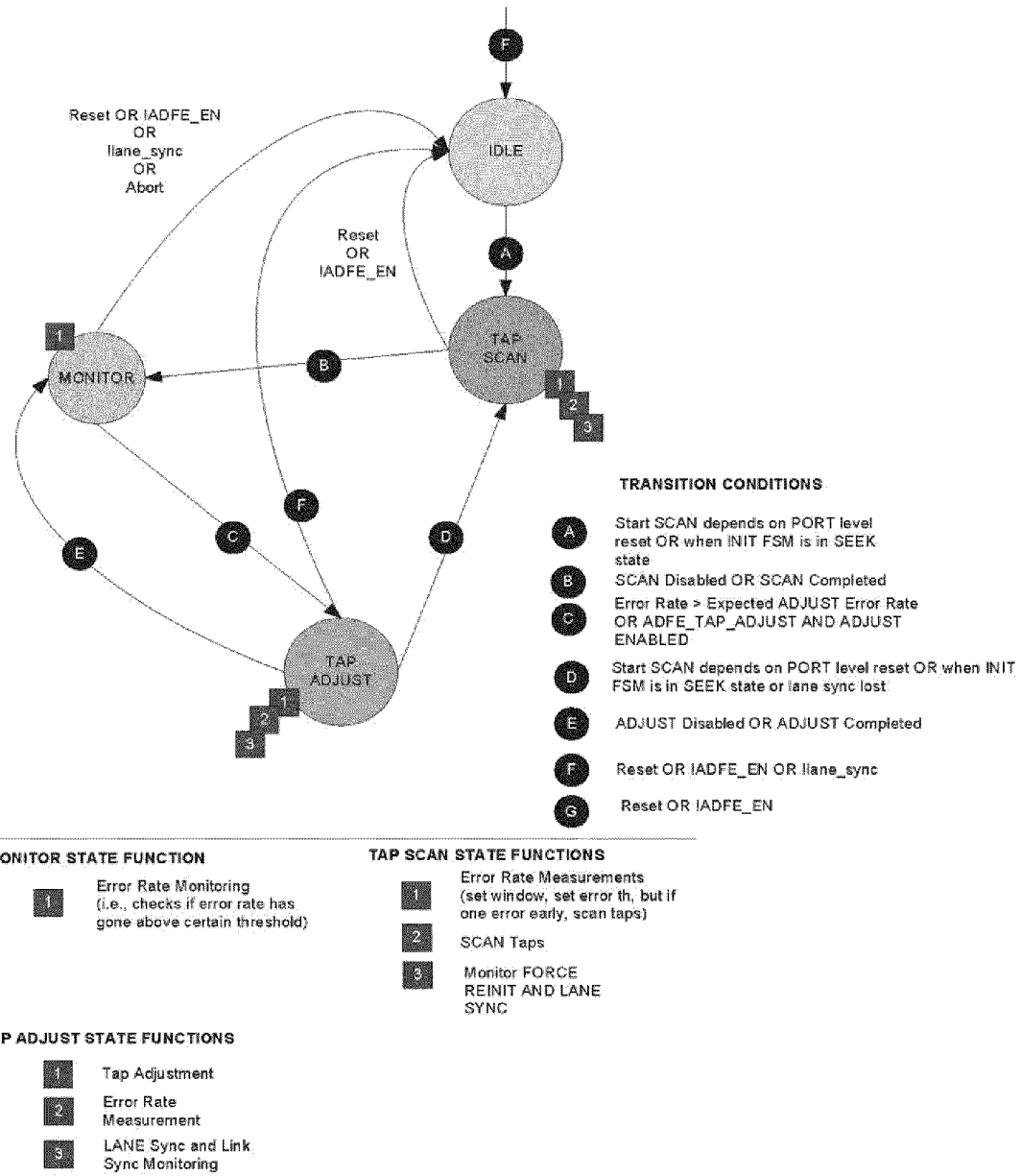
FIG. 5 illustrates, generally at 500, one embodiment of the invention showing three major parts for an overall solution.

FIG. 5 illustrates, generally at 500, one embodiment of the invention showing three major parts for an overall solution. First, there is scanning DFE coefficients to arrive at original DFE settings. Second, there is monitoring 8B10B errors to determine if DFE settings should be adjusted. Third, there is DFE and transmitter tap adjustment based on target error count.

In one embodiment, for example FIG. 5 illustrates a BER Adaptive DFE Top Level State Machine. On Reset, the algorithm moves to IDLE state. If adaptive DFE is enabled and Tap scanning is enabled, then the TAP SCAN algorithm is executed as part of link initialization. Bit error monitoring then begins. If the bit error rate is determined to be too high, then tap adjustment is performed. If during monitoring or tap adjustment the bit error rate causes link reinitialization, then the TAP SCAN algorithm may optionally be executed again as part of link initialization. Once the preliminary coefficients for transmit pre- and post-taps and receive DFE taps are programmed, the adaptive DFE algorithm begins by performing error rate monitoring in the MONITOR state. If the bit error rate is determined to be too high, then tap adjustment is performed in the TAP ADJUST state. The algorithm moves back to MONITOR state, when tap adjustment is completed, i.e., the target error rate for tap adjustment is reached or if TAP ADJUST is disabled.

Figure 6A:
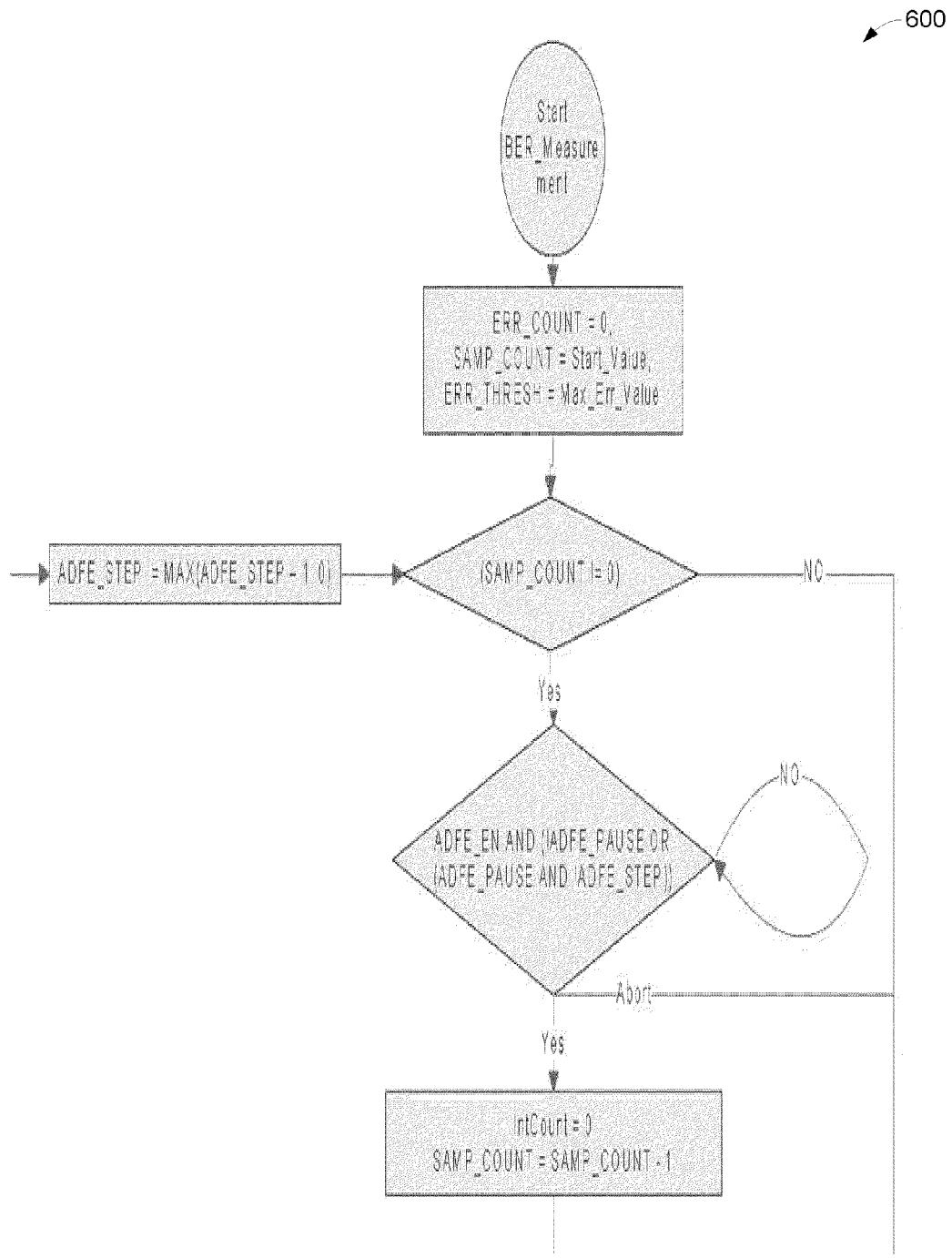
FIG. 6A and FIG. 6B are hereby denoted as FIG. 6 which illustrates, generally at 600, one embodiment of the invention showing a BER Measurement Function flow chart.
Figure 6B:
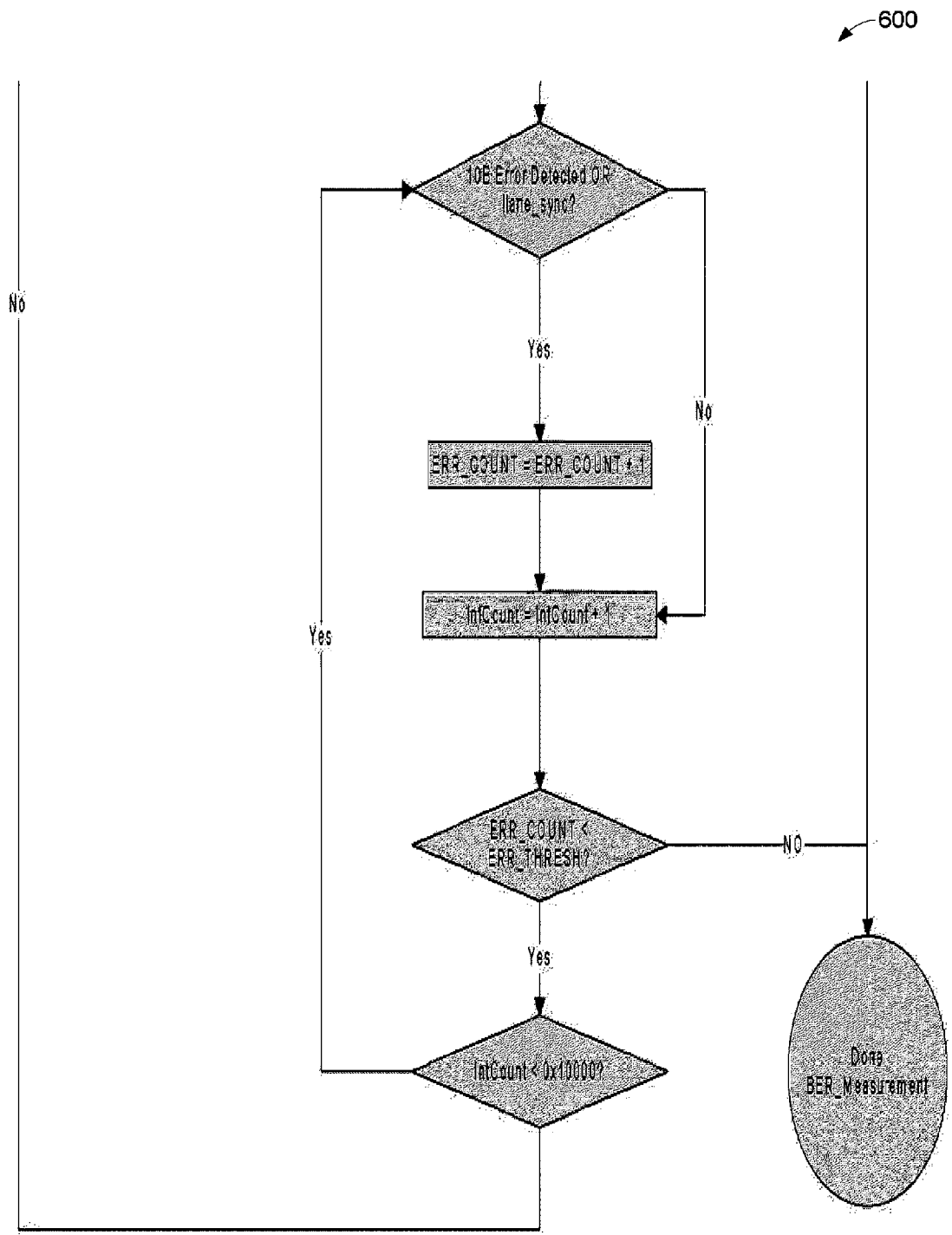

FIG. 6 illustrates, generally at 600, one embodiment of the invention showing a BER Measurement Function flow chart. The BER measurement function determines the signal quality with the current tap settings. BER measurement is called by the SCAN and ADJUST state machines.

The BER measurement function has the following terms:

Start_Value: when the BER_measurement function is called from SCAN, Start_Value is the value of the SCAN_SAMP_COUNT field of the "Lane n Scan ADFE Sample Control Register (LANE_n_SADFE_SAMP_CTRL_CSR)". When BER_measurement is called from ADJUST, Start_Value is the value of the ADJ_SAMP_COUNT field of the "Lane n Adjustment ADFE Sample Control Register (LANE_n_AADFE_SAMP_CTRL_CSR)".

Max_Err_Value: when the BER_measurement function is called from SCAN, Max_Err_Value is the value of the SCAN_TX_MAX_ERR in "Lane n TX Scan ADFE Control Register (LANE_n_TSADFE_CTRL_CSR)", SCAN_T1_MAX_ERR or SCAN_T0n5_MAX_ERR field of the "Lane n Scan ADFE Sample Control Register (LANE_n_SADFE_SAMP_CTRL_CSR)" or SCAN_T2_MAX_ERR field of the "Lane n Scan ADFE Range Error Control Register (LANE_n_SADFE_RERR_CTRL_CSR)". When BER_measurement is called from ADJUST, Max_Err_Value is the value of the ADJ_ERR_MAX field of the "Lane n Adjustment ADFE Limits Control CSR (LANE_n_AADFE_LIM_CTRL_CSR)".

Lane_sync: Indicates whether, according to the RapidIO spec, the lane is receiving valid 10B code groups.

IntCount: A 16 bit counter which indicates when a 10 bit sample has been received by the SerDes. When this counter wraps around, SAMP_COUNT is decremented by 1. NOTE: The intent of this counter is to be able to count errors on each 10 bit code group received by the SerDes for 64K samples. The counter maximum value, and it's clock rate, can vary according to implementation needs.

10B Error Detected: Indicates when an invalid code group has been received. A code group is invalid either through encoding (not a valid 10B code group) or disparity (not the expected disparity for the code group). NOTE: Ideally, only one error should be added to ERR_COUNT for each 10B code group received.

MAX: Returns the maximum value of the parameters passed in.

Abort: ADFE_EN has transitioned from 1 to 0, at the same time that ADFE_PAUSE has transitioned from 1 to 0 (The Abort condition can be created for debugging by the User).

The BER measurement function may be paused using the ADFE_PAUSE field of the "Lane n Adaptive DFE Control Register (LANE_n_ADFE_CTRL_CSR)". When the ADFE_PAUSE field is set, software can precisely control the forward progress of the BER sampling function, and by implication the BER based SCAN and ADJUST adaptive DFE functionality, by setting the ADFE_STEP field of the "Lane n Adaptive DFE Control Register (LANE_n_ADFE_CTRL_CSR)" to the number of samples which may be taken before the BER sampling is again paused.

Figure 7A:
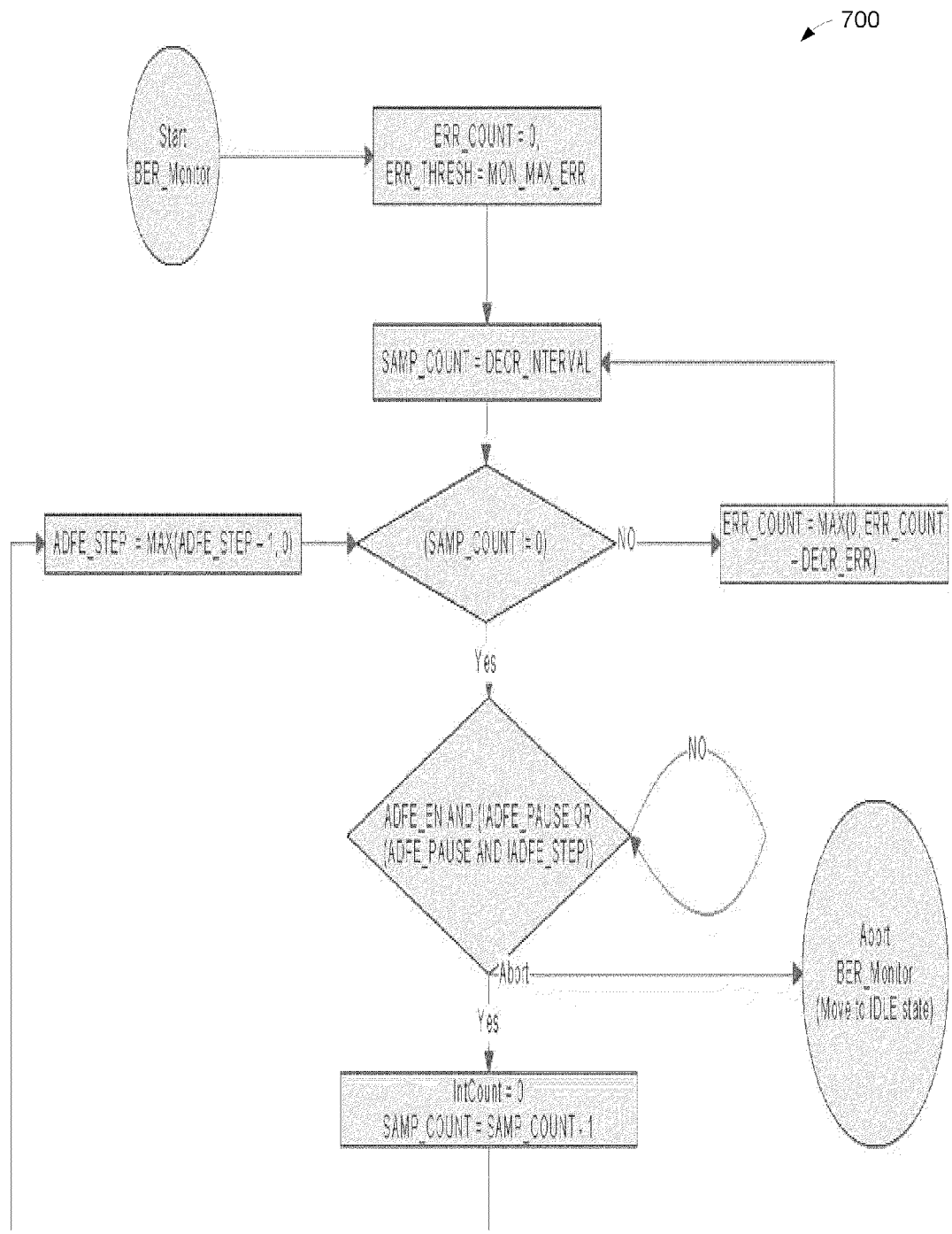
FIG. 7A and FIG. 7B are hereby denoted as FIG. 7 which illustrates, generally at 700, one embodiment of the invention showing a BER Monitoring State Machine.
Figure 7B:
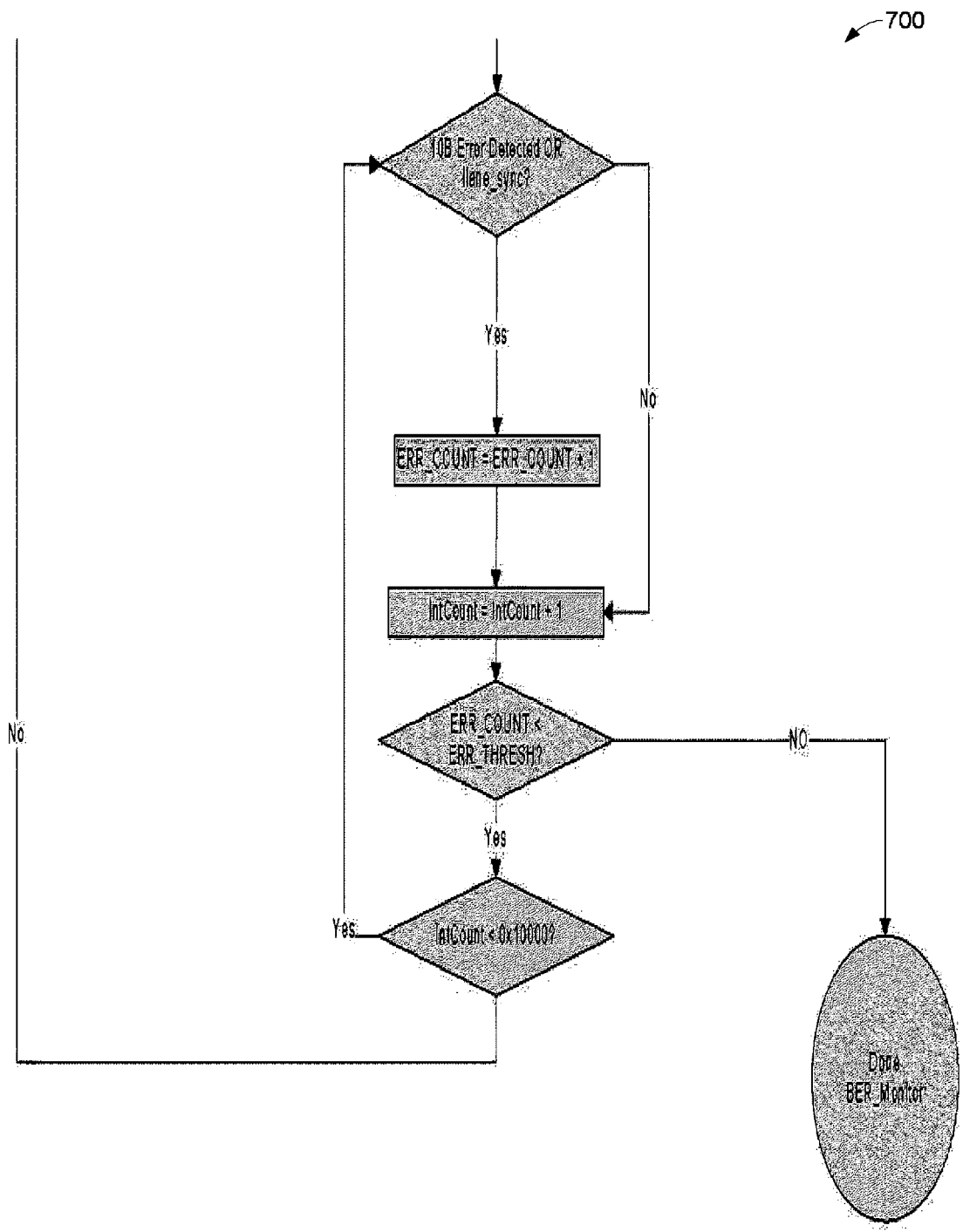

FIG. 7 illustrates, generally at 700, one embodiment of the invention showing a BER Monitoring State Machine. The BER monitoring function continually checks that the bit error rate of the lane exceeds the signal quality requested. If the signal quality degrades, then the ADJUST function is invoked (for more information, see "BER Adaptive DFE Top Level State Machine" and the associated writeup with respect to FIG. 5).

The BER monitoring function has the following terms:

Lane_sync: Indicates whether, according to the RapidIO spec, the lane is receiving valid 10B code groups.

IntCount: A 16 bit counter which indicates when a 10 bit sample has been received by the SerDes. When this counter wraps around, SAMP_COUNT is decremented by 1. NOTE: The intent of this counter is to be able to count errors on each 10 bit code group received by the SerDes for 64K samples. The size of the counter, and it's clock rate, can vary according to implementation needs.

10B Error Detected: Indicates when an invalid code group has been received. A code group is invalid either through encoding (not a valid 10B code group) or disparity (not the expected disparity for the code group). NOTE: Ideally, only one error should be added to ERR_COUNT for each 10B code group received.

MAX: Returns the maximum value of the parameters passed in.

Abort: ADFE_EN has transitioned from 1 to 0, at the same time that ADFE_PAUSE has transitioned from 1 to 0.

The BER monitoring function may be paused using the ADFE_PAUSE field of the "Lane n Adaptive DFE Control Register (LANE_n_ADFE_CTRL_CSR)". When the ADFE_PAUSE field is set, software can precisely control the forward progress of the BER monitoring function, and by implication the BER MONITOR adaptive DFE functionality, by setting the ADFE_STEP field of the "Lane n Adaptive DFE Control Register (LANE_n_ADFE_CTRL_CSR)" to the number of samples which may be taken before the BER sampling is again paused.

Figure 8:
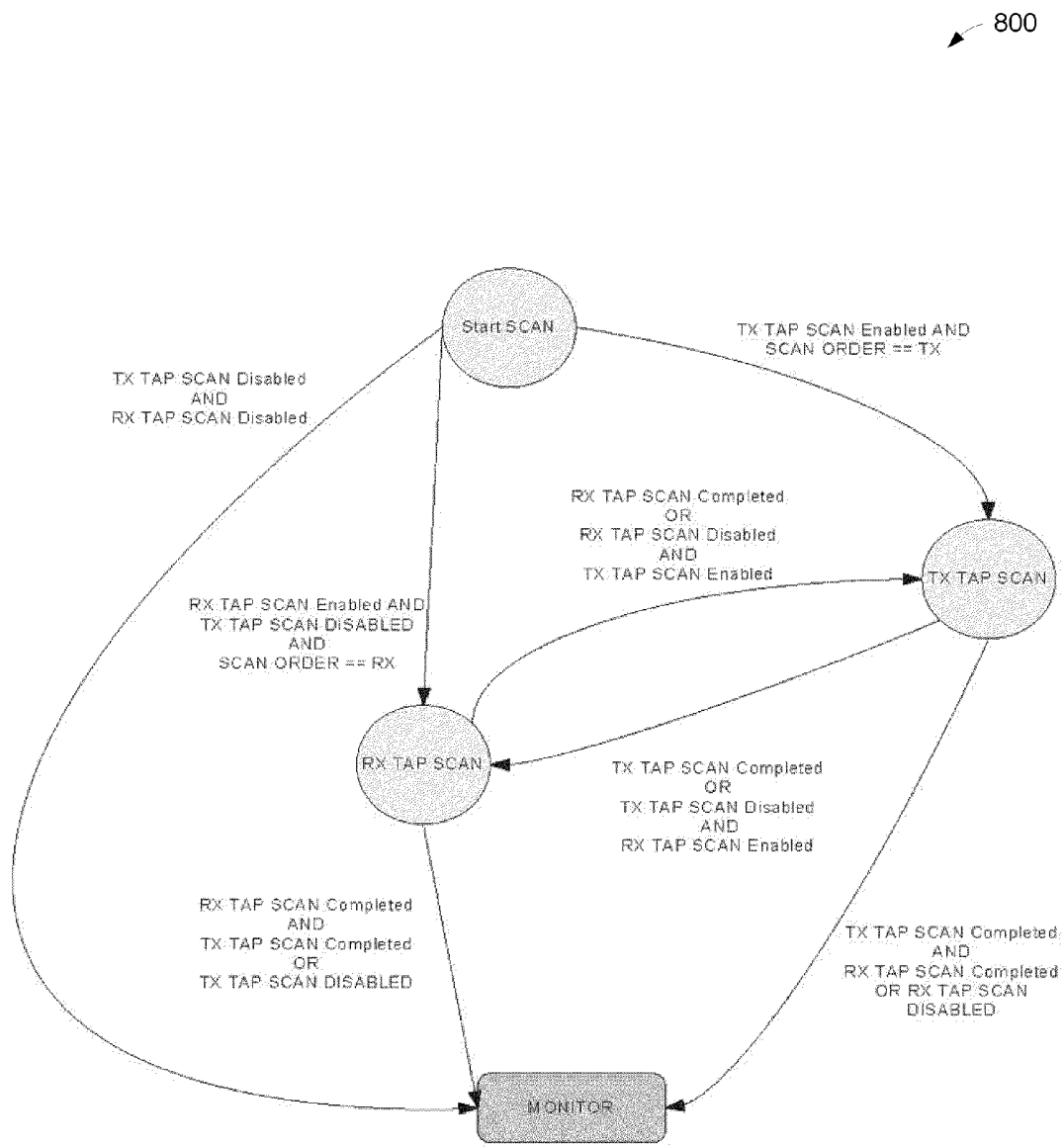
FIG. 8 illustrates, generally at 800, one embodiment of the invention showing a Scan Top Level FSM.

FIG. 8 illustrates, generally at 800, one embodiment of the invention showing a Scan Top Level FSM. Here is shown the top level of BER based adaptive DFE SCAN algorithm in the form of a state machine. The SCAN state machine operates in two phases. One phase scans the link partners TX pre and post-emphasis parameters. The other phase scans the links RX DFE parameters. Each phase is enabled individually by the BER_RX_SCAN_EN and BER_TX_SCAN_EN fields of the "Lane n Adaptive DFE Control Register (LANE_n_ADFE_CTRL_CSR)". It is possible to control the order of the two phases by setting the BER_SCAN_TX_FIRST bit field of the "Lane n Adaptive DFE Control Register (LANE_n_ADFE_CTRL_CSR)" appropriately.

Figure 9:
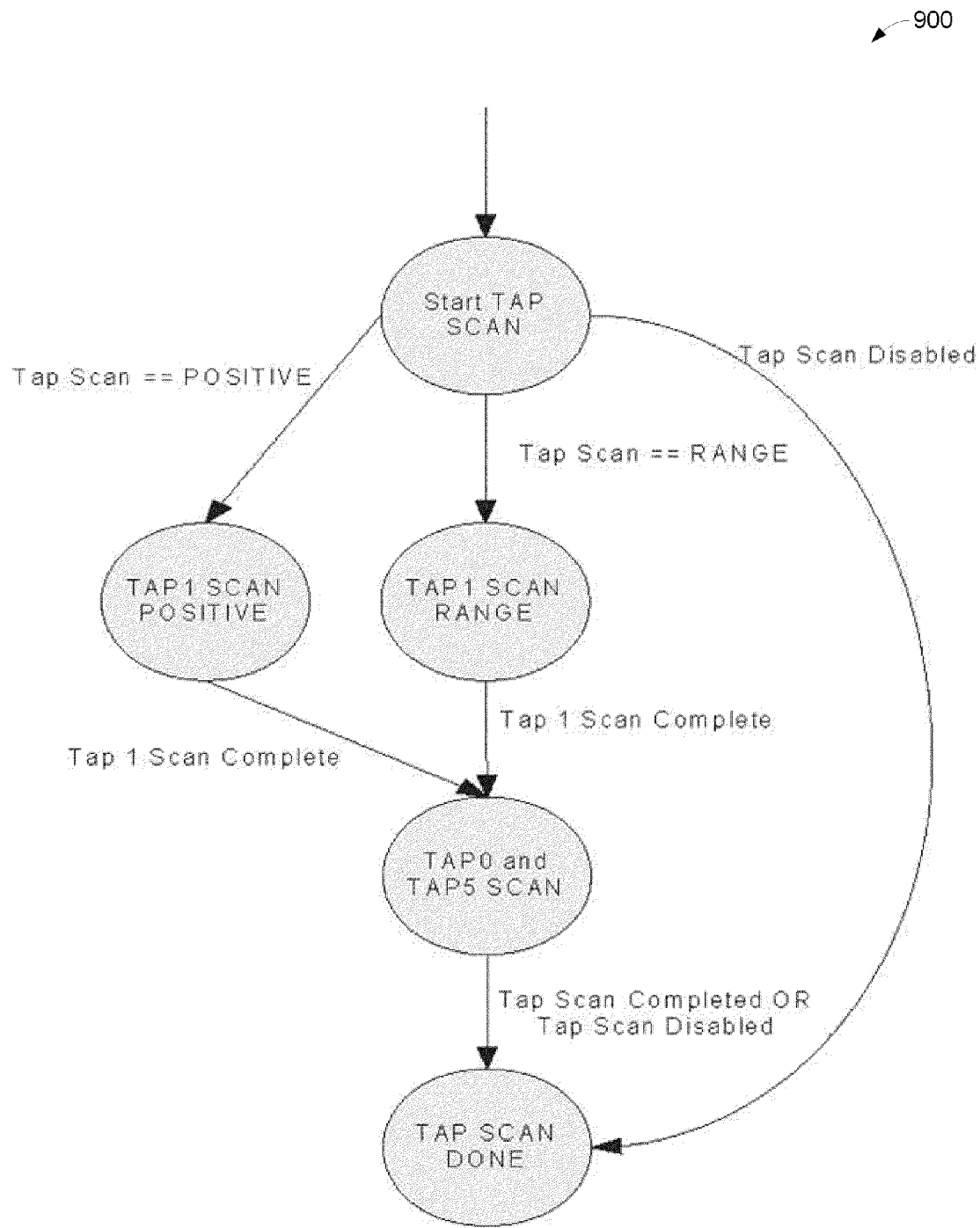
FIG. 9 illustrates, generally at 900, one embodiment of the invention showing a Receiver Tap Scanning Master FSM.

FIG. 9 illustrates, generally at 900, one embodiment of the invention showing a Receiver Tap Scanning Master FSM. Tap scanning at the receiver is controlled by the receiver master tap scanning state machine. Scanning receiver tap values occurs in three phases:

Scan Tap 1, 2, 3 and 4 values.
Scan Tap 0 value
Scan Tap 5 (OFFSET) value

Figure 10A:
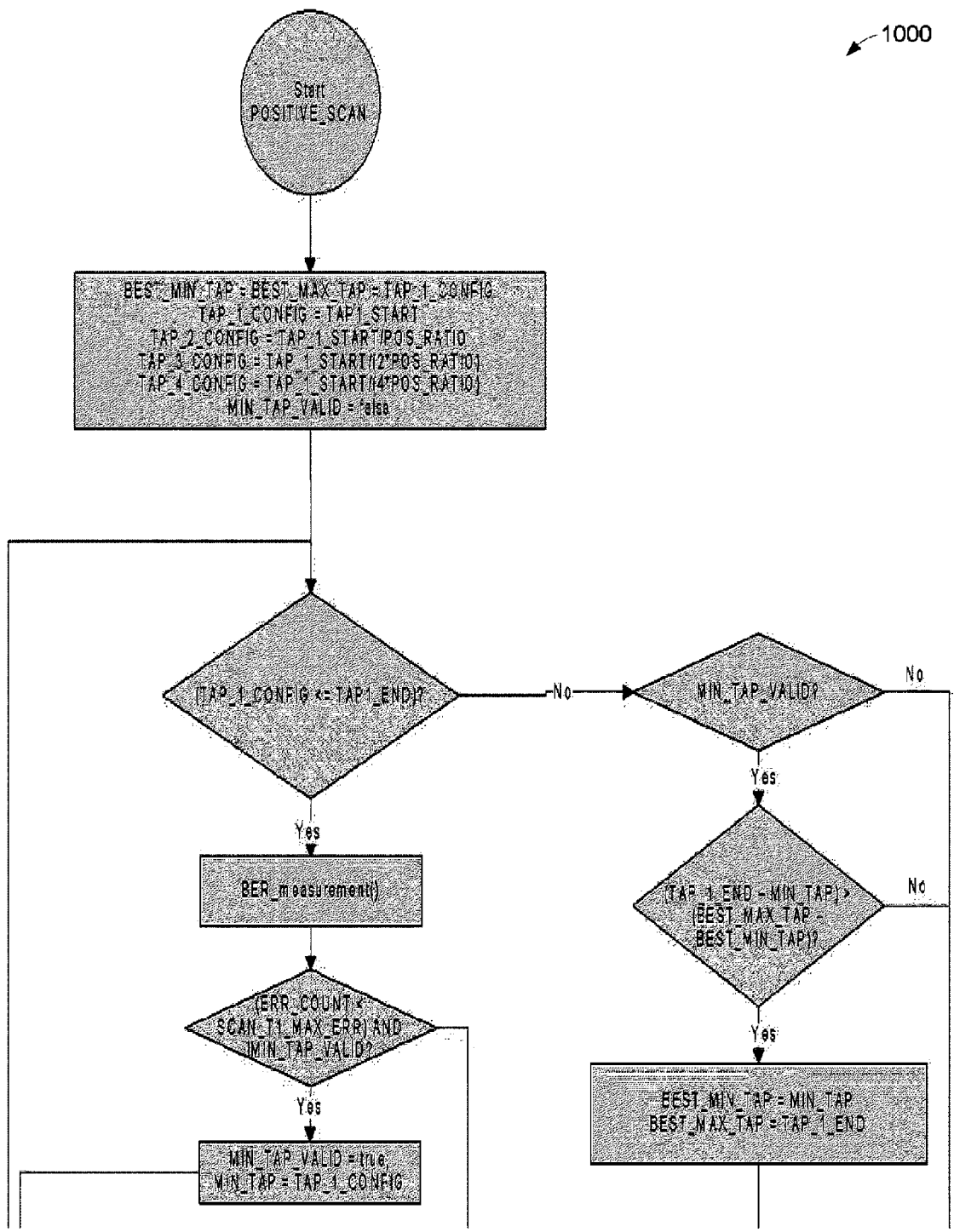
FIG. 10A and FIG. 10B are hereby denoted as FIG. 10 which illustrates, generally at 1000, one embodiment of the invention showing a Receiver Tap Scanning Algorithm using Positive Coefficient Values.
Figure 10B:
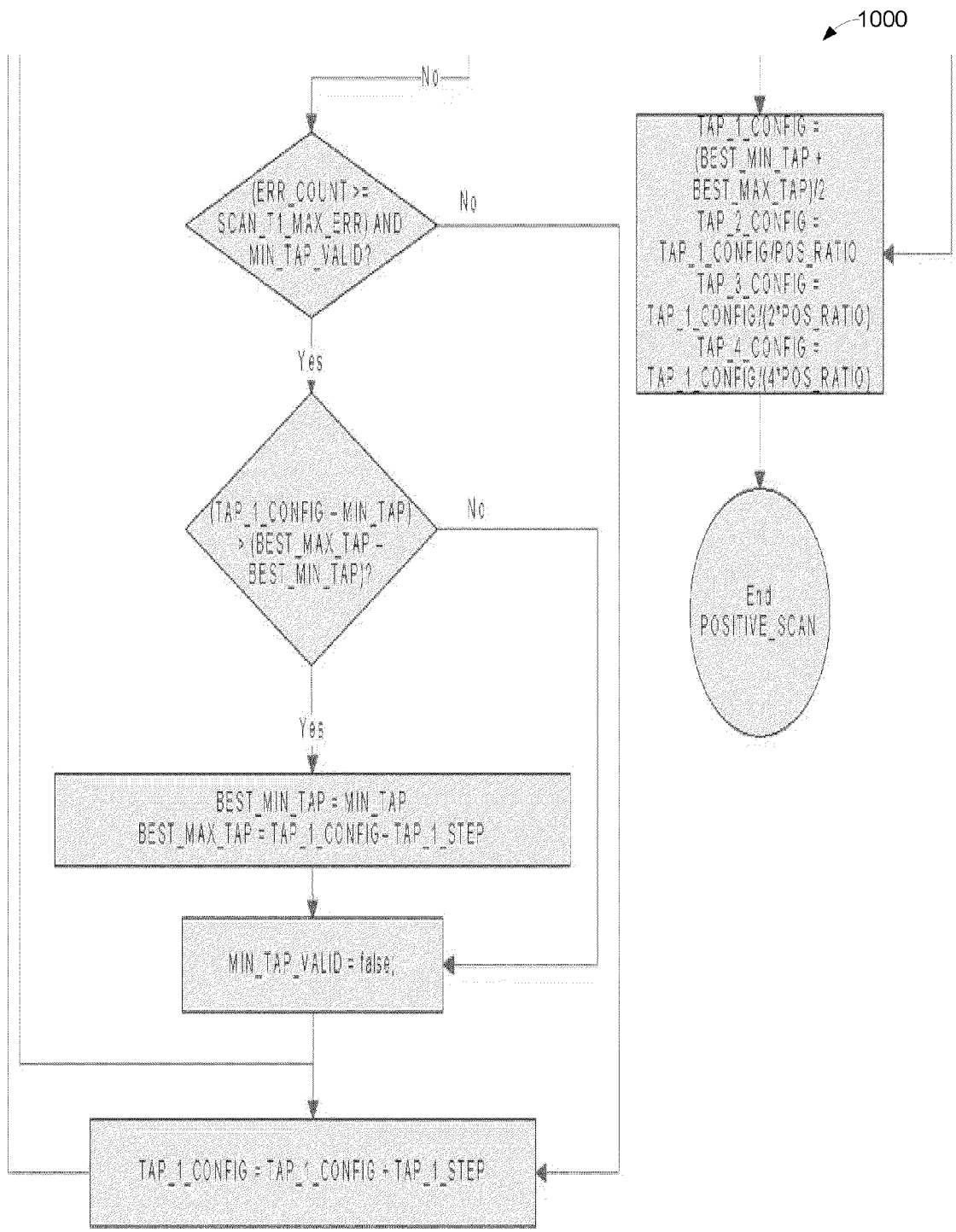
Figure 11A:
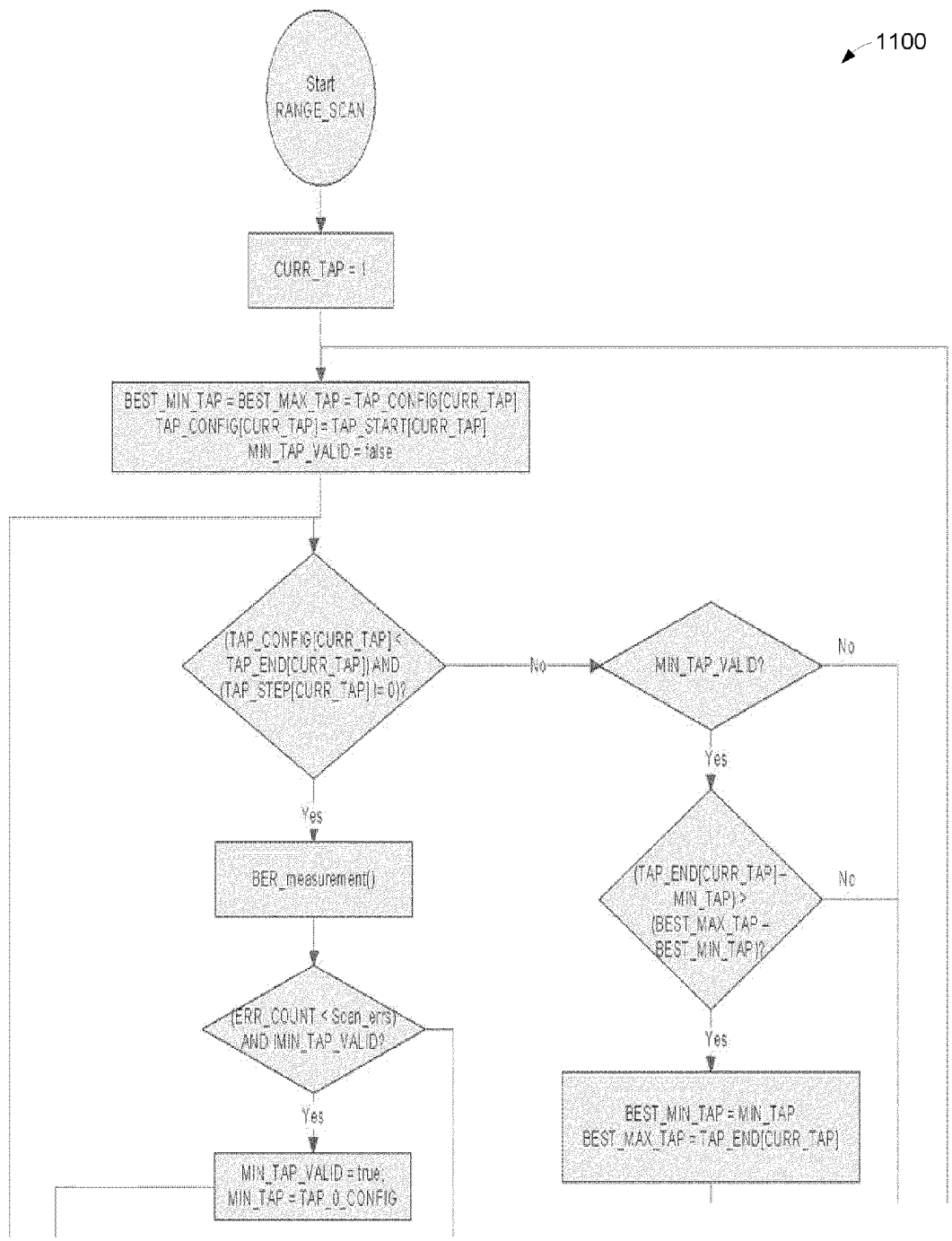
FIG. 11A and FIG. 11B are hereby denoted as FIG. 11 which illustrates, generally at 1100, one embodiment of the invention showing a Receiver Tap1 Scanning Algorithm using Programmed Coefficient Range.
Figure 11B:
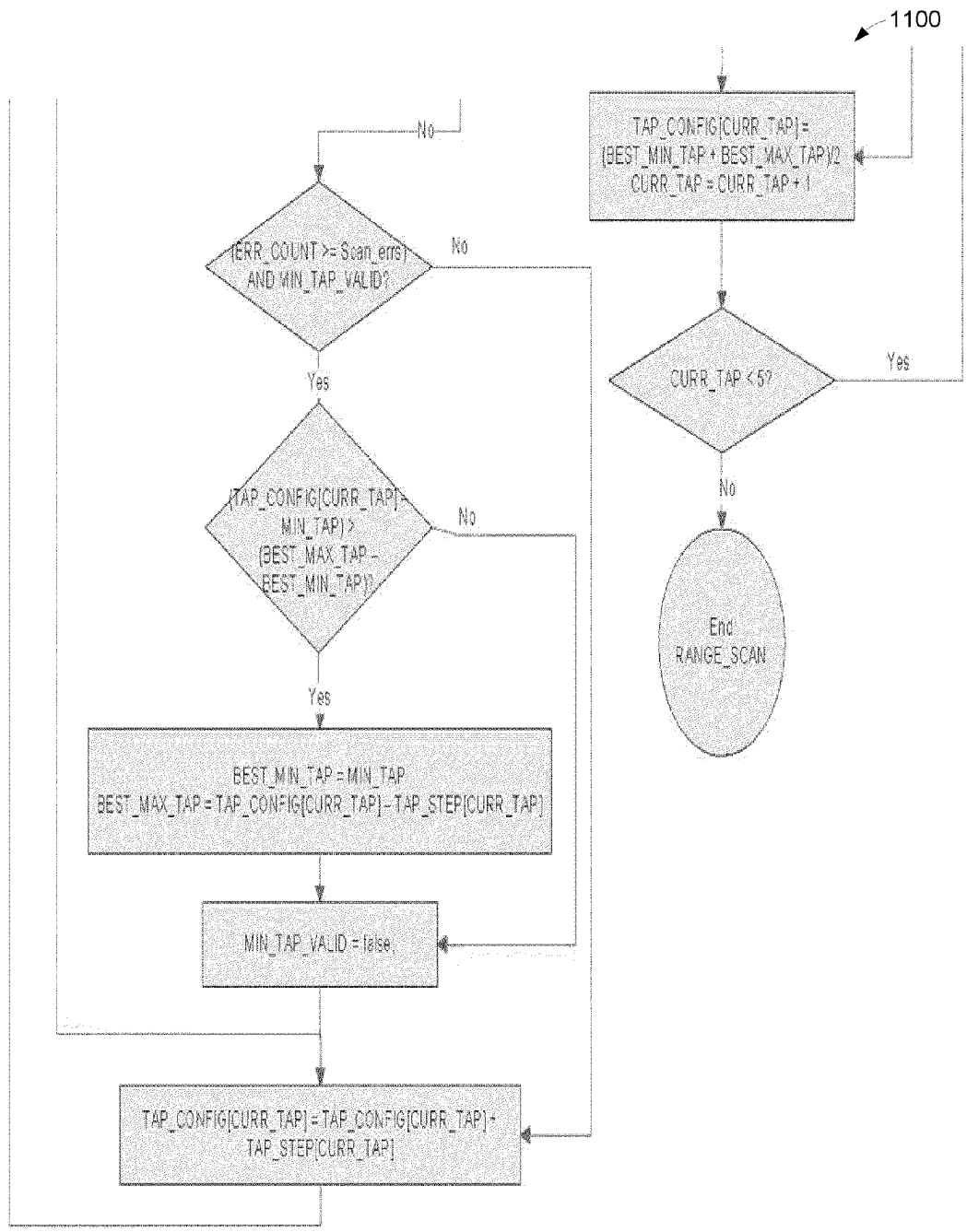
Figure 12A:
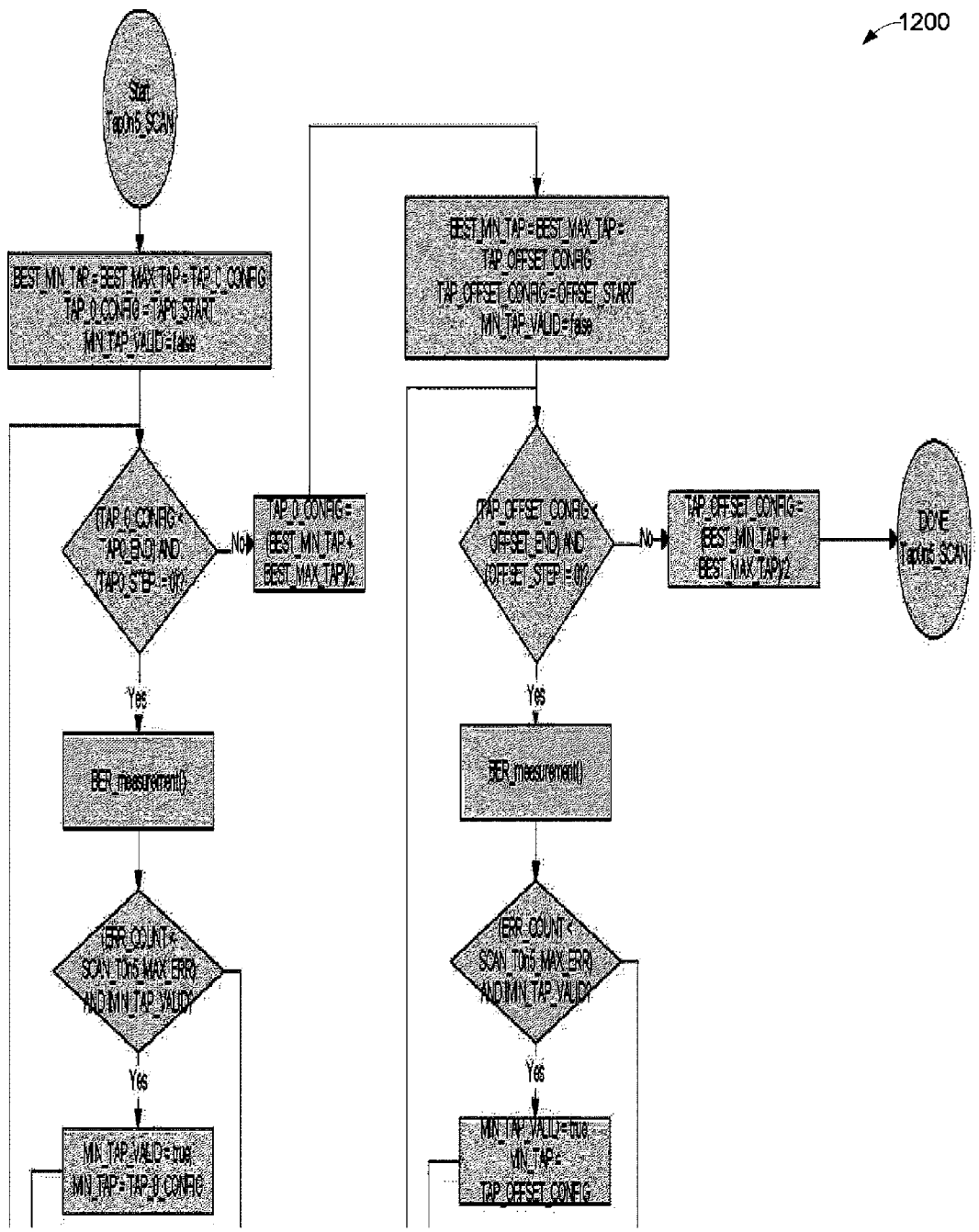
FIG. 12A and FIG. 12B are hereby denoted as FIG. 12 which illustrates, generally at 1200, one embodiment of the invention showing a Receiver Tap 0 and 5 Scanning Algorithm, Programmed Coefficient Range.
Figure 12B:
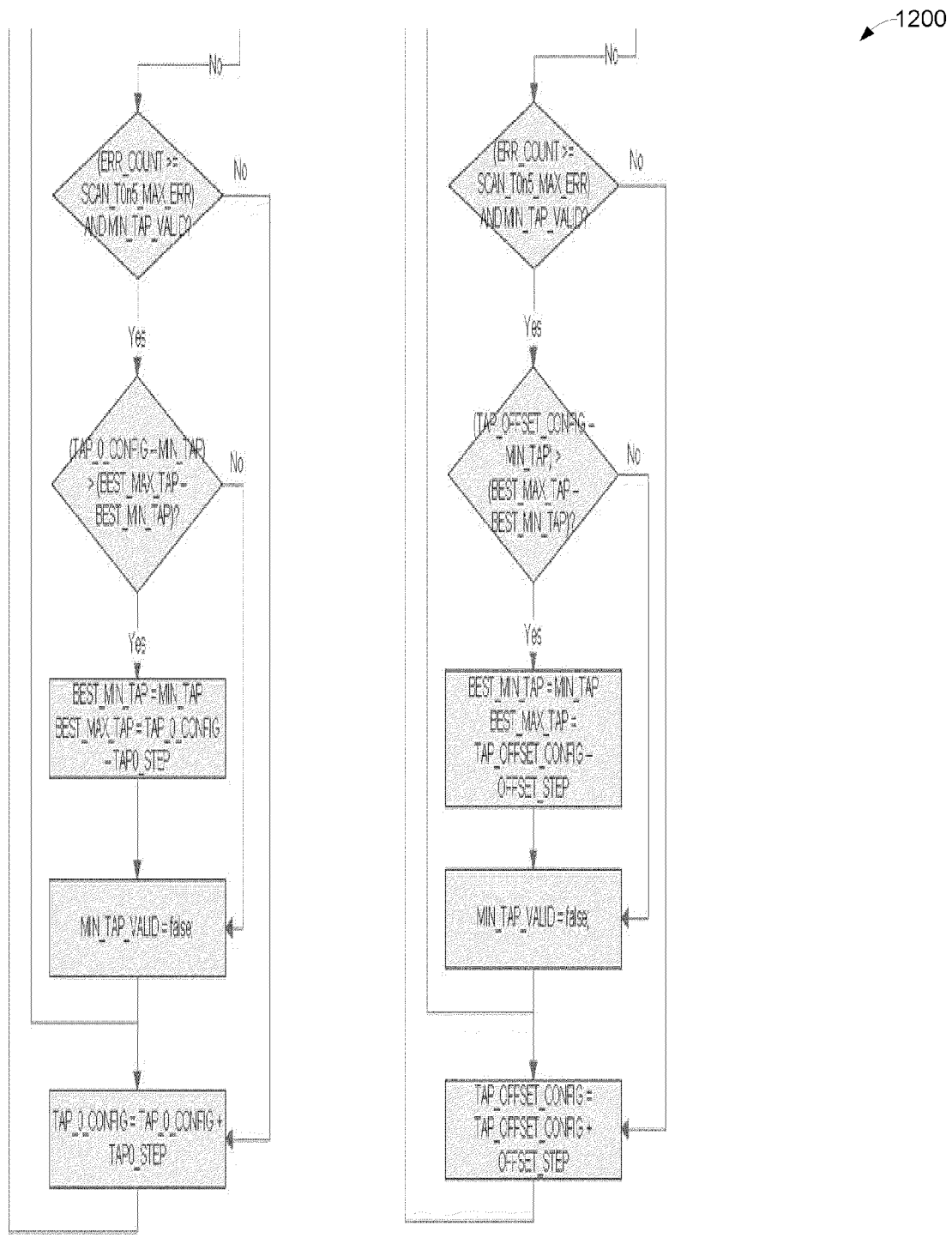

Scanning Tap 1, 2, 3 and 4 values can be done using positive coefficient values (TAP SCAN POSITIVE), which sets tap 2, 3, and 4 values as a ratio to Tap 1 value. Tap 1, 2, 3 and 4 can also be done in tap sequence using a programmed coeffcient range (TAP SCAN RANGE) as shown in the master receiver tap scanning FSM. The algorithm flow charts are provided in "Receiver Tap Scanning Algorithm using Positive Coefficient Values" as illustrated in FIG. 10, "Receiver Tap1 Scanning Algorithm using Programmed Coefficient Range" as illustrated in FIG. 11, and "Receiver Tap 0 and 5 Scanning Algorithm, Programmed Coefficient Range" as illustrated in FIG. 12.

Selection of TAP SCAN POSITIVE or TAP_SCAN_RANGE is based on the value of the POS_RATIO field of the "Lane n RX Scan ADFE Tap 1 Control Register (LANE_n_RSADFE_TAP1_CTRL_CSR)". If POS_RATIO is 0, the TAP SCAN RANGE algorithm is enabled.

In TAP SCAN POSITIVE state, while keeping value of tap 0 to the pre-programmed value, the algorithm scans through all values of tap 1. For each value of tap 1, the algorithm sets values for tap 2 to 4 to either ½, or ¼, or ⅛ of tap 1 to tap 3 respectively. For example, if tap 1 value is set to 8 and POS_RATIO is set to ½, then values for tap 2 to 4 would be 4, 2, and 1 respectively. Only positive values are used for tap 2 to tap 4. Depending on the channel, a range of tap values will provide error rate below a certain error rate threshold. While keeping tap 0 value constant and scanning through values of tap 1, the algorithm keeps track of values for which error rate remains below a certain threshold and picks a middle value in the largest contiguous range of good values. With best tap settings for tap 1 to tap 4, the algorithm scans through remaining values of tap 0, keeps track of the values for which error rate remains below a certain threshold and picks a value in the middle of the largest contiguous range of good values. With best tap settings for tap 0 to tap 4, the algorithm scans all values of TAP_OFFSET and picks the value for which error rate remains below a certain threshold.

In TAP SCAN RANGE state, the receiver identifies DFE coefficients by iterating over all tap values in range instead of just using a particular POS_RATIO for tap 2 to tap 4. While keeping tap 0 value to the pre-programmed value, the algorithm scans through all value in range for tap 1 and keeps the end values for which error rate remains below a certain threshold and picks a value in the middle. While keeping tap 0 to pre-programmed and tap 1 to best value identified so far, the algorithm scans through all value in range for tap 2 and keeps the end values for which error rate remains below a certain threshold and picks a value in the middle. The algorithm continues until values for tap 3 and tap 4 are identified. With best tap values for tap 1 to tap 4, the algorithm scans through remaining values for tap 0 for which error rates remains below a certain threshold and keeps the end values for which error rate remains below a certain threshold and picks a value in the middle. With best values for tap 0 to tap 4, the algorithm scans through all values for TAP_OFFSET in a similar fashion and picks the middle value that provides error rate below a certain threshold.

In both states, best coefficients are identified to meet the target error rate thresholds configured by the user.

FIG. 10 illustrates, generally at 1000, one embodiment of the invention showing a Receiver Tap Scanning Algorithm using Positive Coefficient Values.

FIG. 11 illustrates, generally at 1100, one embodiment of the invention showing a Receiver Tap1 Scanning Algorithm using Programmed Coefficient Range.

FIG. 12 illustrates, generally at 1200, one embodiment of the invention showing a Receiver Tap 0 and 5 Scanning Algorithm, Programmed Coefficient Range.

Figure 13A:
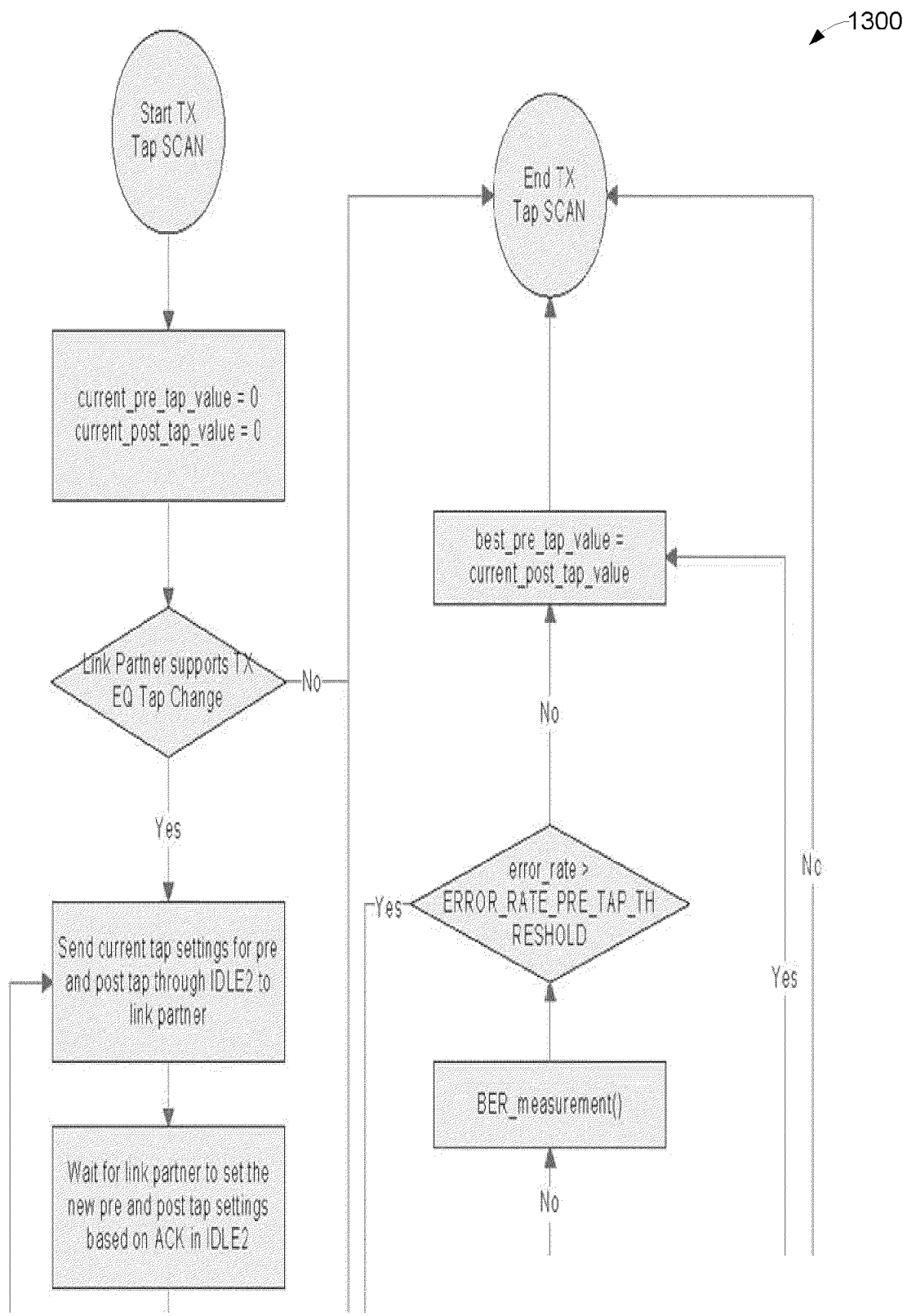
FIG. 13A and 13B are hereby denoted as FIG. 13 which illustrates, generally at 1300, one embodiment of the invention showing a Transmitter Pre- and Post-Emphasis Tap Scanning algorithm flow chart.
Figure 13B:
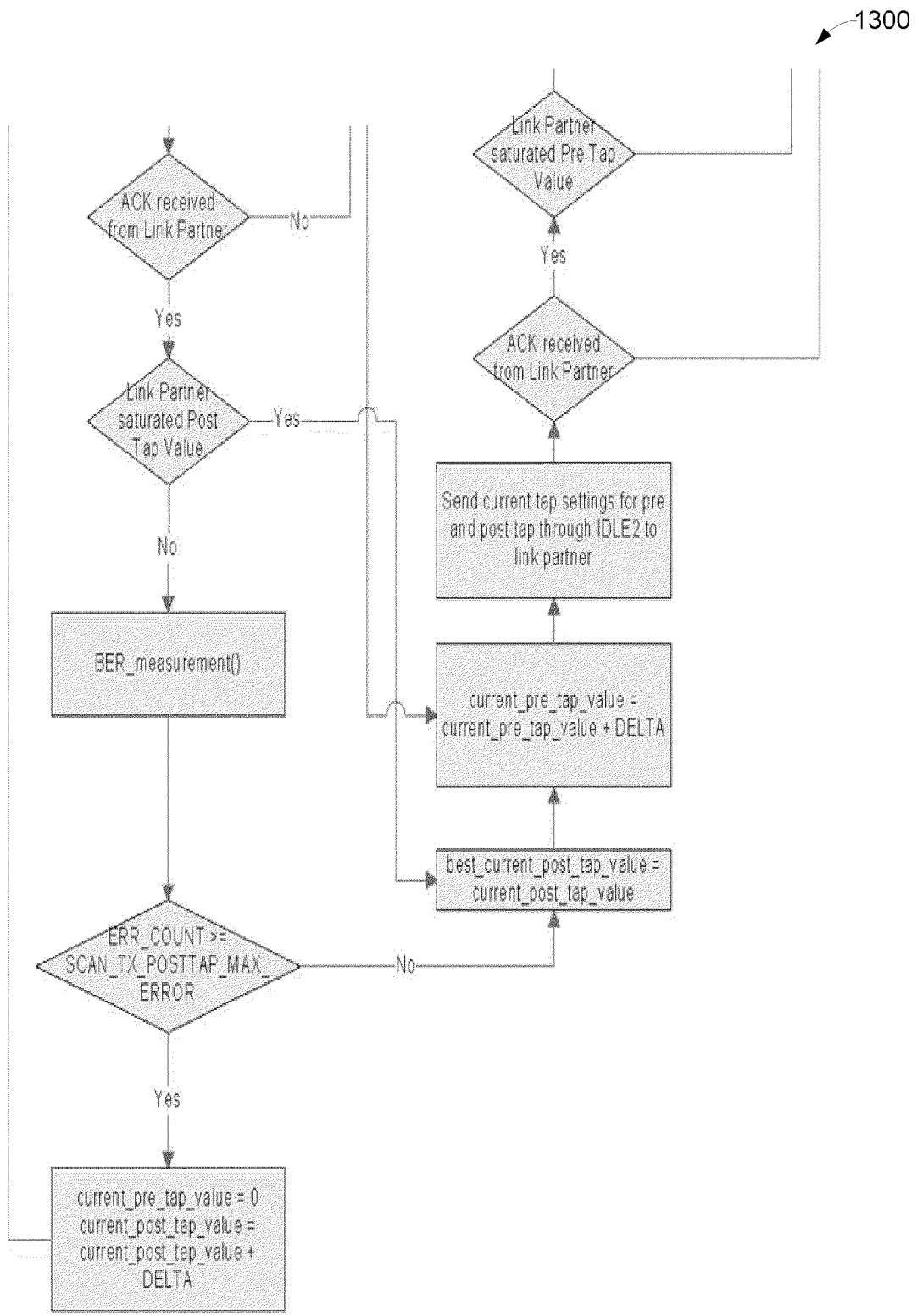

FIG. 13 illustrates, generally at 1300, one embodiment of the invention showing a Transmitter Pre- and Post-Emphasis Tap Scanning algorithm flow chart. It is possible to identify a set of optimized settings for the transmitter pre- and post-tap coefficients either off-line or on-line through transmission of IDLE2 (idle sequence 2) CS (command and status). In off-line mode, transmitter taps are optimized by measuring the link partner's receiver error rate. In on-line mode, IDLE2 CS is used to set link-partner's transmitter tap settings while measuring error rate at the receiver. In both cases, 8B10B code error is used as the metric. Tap scanning may begin by controlling registers.

In off-line mode, to identify transmitter pre- and post-tap settings, you need to scan through the values in the range for these while measuring error rate link-partner's receiver. At the transmitter, tap scanning is performed for the post tap first by measuring the link partner's receiver error rate while keeping the pre-tap and receiver DFE tap settings fixed. Once the best post-tap value is identified, the pre-tap value is scanned while keeping the post-tap value to the best value and by measuring the link-partner's receiver error rate.

In on-line mode, to identify optimum tap settings in the transmitter equalizer, it is possible to scan through post and pre-tap settings the receiver could scan through various tap settings for pre- and post-taps iteratively to meet the target error rate performance at the receiver specified by the user.

Figure 14A:
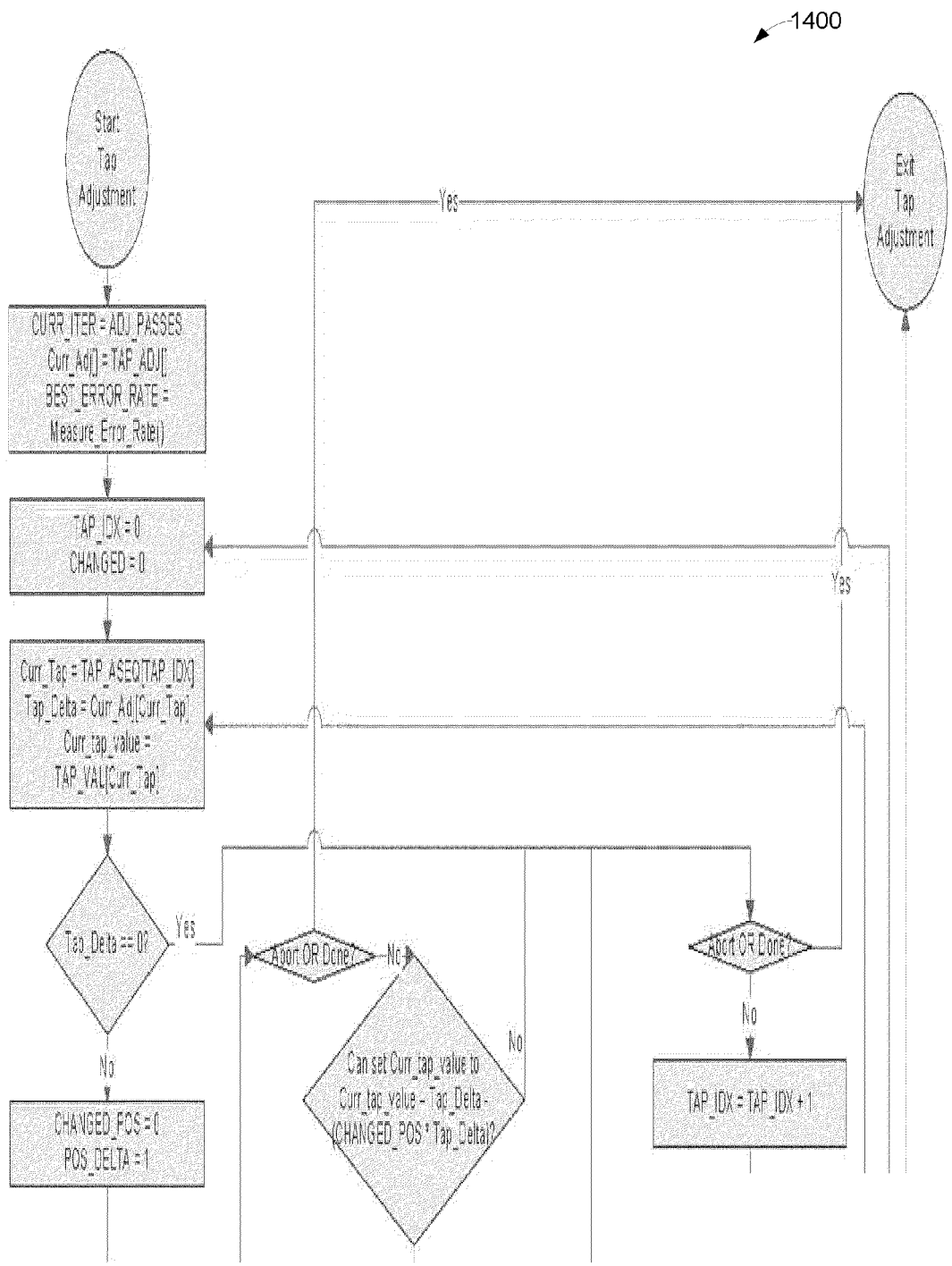
FIG. 14A and FIG. 14B are hereby denoted as FIG. 14 which illustrates, generally at 1400, one embodiment of the invention showing a BER Adaptive DFE Tap Adjustment State Machine.
Figure 14B:
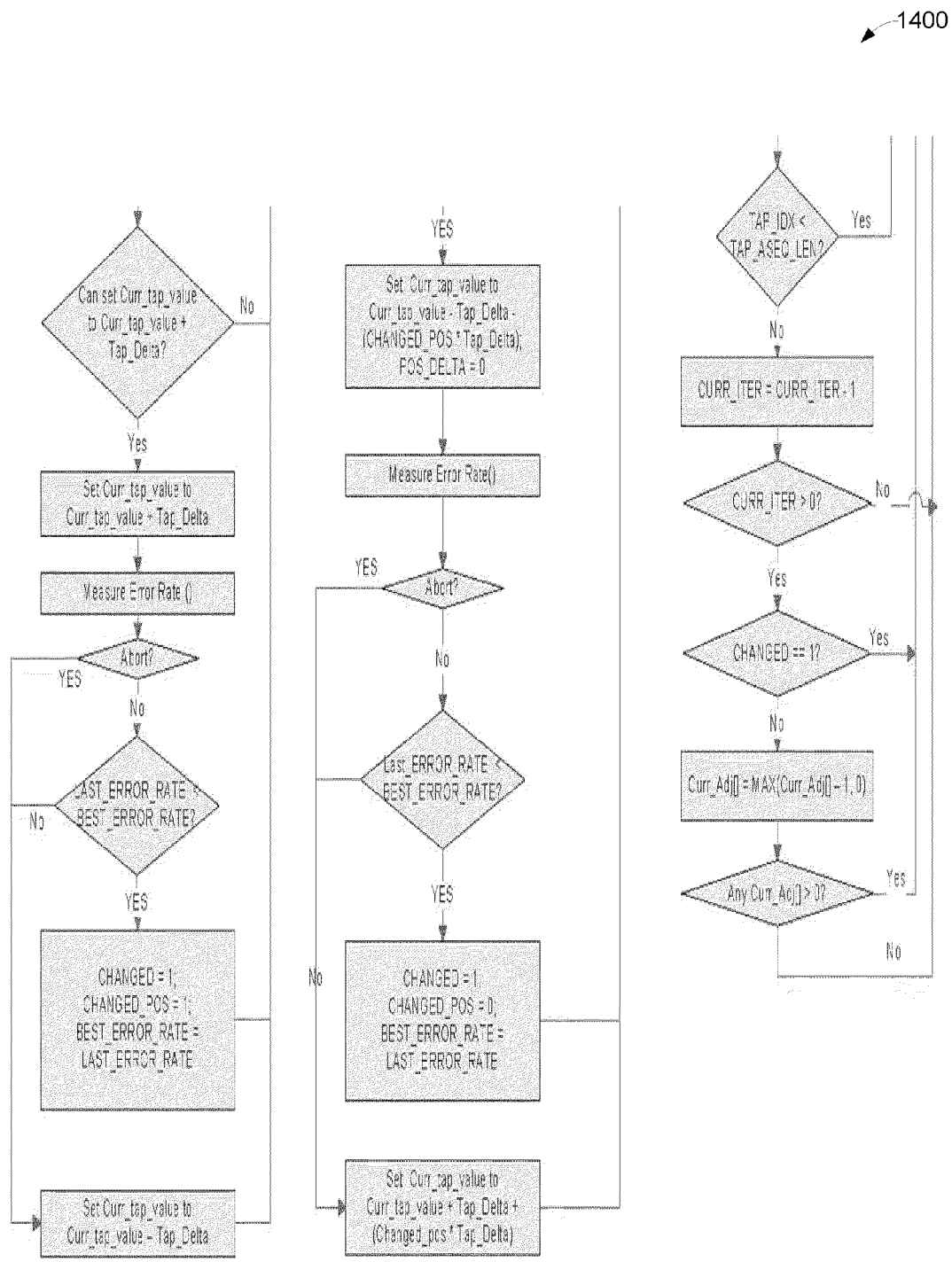

FIG. 14 illustrates, generally at 1400, one embodiment of the invention showing a BER Adaptive DFE Tap Adjustment State Machine. This state machine has the following terms:

Curr_Adj: The current values of tap adjustment for each tap.

[ ]—All indices for the stated variable

Curr_Tap—The Tap being adjusted

Curr_tap_value—Value of Curr_Tap

Abort—ADFE_EN has transitioned from 1 to 0. Stop tap adjustment, safely.

Tap_Delta—amount by which the Curr_Tap will be adjusted.

In another embodiment of the invention, a RapidIO port is connected to one or more lanes. It is possible to determine the signal quality for a port, and for each lane connected to the port. A functional measure of the signal quality of a port or lane is the bit error rate (BER). A bit error is the inversion of a single transmitted bit from its intended value. The BER is the probability that any one bit will be inverted. The RapidIO Specification (Rev. 2.1) requires processing elements to demonstrate a BER of 10E-12, and to be capable of a BER of 10E-15.

Bit errors can be detected in the following ways:

Invalid 10-bit code group—RapidIO encodes each 8 bits of data sent using a 10-bit code with excellent electrical and fault detection properties. Single-bit transmission errors always result in detection of at least one invalid 10-bit code group. Note that this invalid 10-bit code group may not be the one that experienced the single bit error. Invalid 10-bit code groups are counted for each lane in the LANE_n_STATUS_0_CSR.8B10B DECODE ERROR field.

Invalid Cyclic Redundancy Code (CRC)—The correctness of RapidIO control symbols and packets can be checked using the standard CRC codes. CRC code failures are detected by the port receiving the packet or control symbol. It is not possible to determine which lane of a multi-lane port is responsible for the transmission error that caused the CRC check to fail. CRC code failures can be counted using the PORT_n_ERROR_RATE_CSR.ERROR_RATE_COUNTER field.

Protocol Error—A valid 10-bit code group or control symbol was received at a time that is not compliant with the RapidIO protocol. An example of a protocol error is reception of a 10-bit data code group within the IDLE1 sequence. Protocol failures are detected by the port that receives the packet or control symbol. It is not possible to determine which lane of a multi-lane port is responsible for the transmission error that caused the protocol error. Protocol errors can be counted using the PORT_n_ERROR_RATE_CSR.ERROR_RATE_COUNTER field.

To determine the rate of invalid 10-bit code group reception, read the LANE_n_STATUS_0_CSR.8B10B DECODE ERROR field repeatedly for a time period that corresponds to the bit error rate expected. For example, if the expected BER is 10E-12 for a 6.25 Gbaud link, it is necessary to read the LANE_n_STATUS_0_CSR.8B10B DECODE ERROR after at least 160 seconds has passed. The more often the register is read in this interval, the higher the maximum bit error rate that can be measured.

In another embodiment of the invention, the SerDes DFE Coefficient Optimization may be performed in various ways.

DFE coefficients can be used to optimize signal quality when transmission coefficients are insufficient to achieve the required signal quality. The process of searching the DFE coefficients is known as "scanning." A number of different scan methods can be used to search the DFE coefficients, as described below. These methods depend on the following points:

Tap 0 is an amplifier, and so increases noise as well as signal strength.

Tap number corresponds to the received bit number. Tap 0 is acting on the bit currently being received, Tap 1 values are applied based on the previous bit received, Tap 2 values are applied based on the second last bit received, and so on.

Tap 0, Tap 1, and Tap 2 have the largest impact on signal quality.

Each of the following scan methods depends on finding a Tap 0 value that is sufficient to achieve PORT OK.

"Ratio" Scan Method

When using this method, for each Tap 0 value to be scanned, Tap 1, 2, 3, and 4 values are attempted where Tap 2 is ½ of Tap 1, Tap 3 is ½ of Tap 2, and Tap 4 is ½ of Tap 3. Note that ratios other than ½ can be used. Typically, Tap 1 values cover the entire allowed range for Tap 1 (0-31). Once the tap values are programmed, a BER measurement is taken for the lane. If the BER is below a selected threshold, this is a "good" tap combination; otherwise, this is not an acceptable tap combination. The optimal tap value is the middle of the largest contiguous range of "good" tap combinations.

The Ratio method is a fast way to approximate tap settings. RapidIO traffic, however, cannot be exchanged while the Ratio method is being executed.

One-at-a-Time" Scan Method

When using this method, Tap 0 is held constant at an expected good value. All Tap 1 values are then programmed and a BER measurement is taken for each one. Again, tap combinations are determined to be "good" or "bad" based on comparison to a BER threshold. The Tap 1 value selected is the middle of the largest contiguous range of "good" Tap 1 values. This procedure is repeated for Tap 2, 3, and 4 while all other taps are held constant.

There are a couple of variations on the 'One at a Time" scan method:

Perform "One at a Time" scanning with Tap 1-4 values initialized to 0, then perform "One at a Time" scanning with the Tap 1-4 values held to their previously selected values.

Perform "Ratio" scanning, then perform "One at a Time" scanning with Tap 1-4 values held to their previously selected values.

The One-at-a-time method can be used to approximate tap settings. It can also be used repeatedly to refine tap settings. RapidIO traffic, however, cannot be exchanged while the One-at-a-time method is being executed.

"Adjustment" Scan Method

When using this method, a sequence of taps and delta values is selected. Each tap has the delta value added and subtracted from it. The bit error rate is measured for each tap value. A tap value is permanently changed if the bit error rate has improved. Once all tap values have been tried, if at least one tap value has been changed then all tap values are again tested using the same delta values. If no tap values have been changed, then the delta values are decreased by 1. Adjustment continues until the delta values for all taps are 0, a bit error rate of 0 has been measured, or if the maximum number of adjustment attempts has been performed.

"Adjustment" can be thought of as a version of the "One-at-a-time" method which restricts the range of tap values examined. Generally, adjustment should only be used when good tap values have been found using the "Ratio" or "One-at-a-time" methods.

Adjustment coefficients can be constrained to allow RapidIO traffic be exchanged while the Adjustment method is being executed. Tap 0, 1, and 2 can be excluded from adjustment, and/or the delta amount can be reduced to 1.

In another embodiment of the invention, the Signal Quality Optimization may be done for Multi-Lane Ports.

The procedure for optimizing the signal quality of multi-lane ports must account for the operation of the link-initialization state machines. The easiest method is to set the transmit strength to 0 for the transmitter on the near link and the link partner for all lanes. This has the effect of halting operation of the link-initialization state machines since no lane can train.

Signal quality can then be optimized for one lane at a time by optimizing the transmit coefficients for one lane in one direction, and then optimizing the DFE coefficients for that same lane in the same direction. Once a lane and direction have been optimized, the transmitter strength should be set back to zero.

Once all lanes have been optimized in each direction as described above, the transmit and DFE coefficients can be programmed to enable correct operation for the RapidIO port.

FIG. 15 illustrates, generally at 1500, various embodiments of the invention.

FIG. 16 illustrates, generally at 1600, various embodiments of the invention.

While the invention has been described in detail with respect to S-RIO Gen2, the invention is not so limited, for example, for a new encoding the techniques of scanning, monitoring, and measurement discussed above may be used. Additionally, for example, performing error count based on 64b/67b coding may be used in addition to 8b/10b. Additionally, CRC may be used for additional detection of errors if required. This would allow, for example, S-RIO Gen3 support.

While the invention has been described in detail with respect to S-RIO, the invention is not so limited and the techniques disclosed are applicable to other high speed links both serial and parallel.

While the invention has been described in detail with respect to 8b/10b one of skill in the art will appreciate that other error count sequences and approaches may be used, for example performing error count based on 64b/67b coding or lane check code word or both for BER estimation as may be applied to links for next generation standards (e.g. S-RIO standards, etc.).

Thus a Method and Apparatus for Channel Equalization in High Speed S-RIO based Communication Systems have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
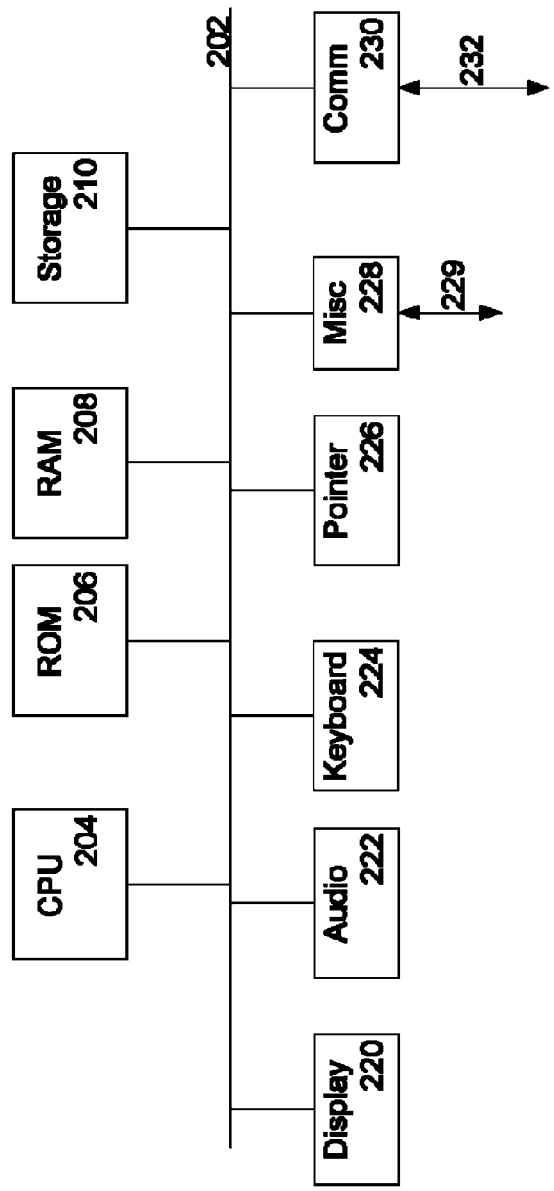
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio 222, keyboard 224, pointer 226, miscellaneous input/output (I/O) devices 228, link 229, communications 230, and port 232. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any non-transitory mechanism for storing or transmitting information in a form readable by a machine (e.g., a computer). For example, a machine-readable medium includes read only memory (ROM); random access memory (RAM); magnetic disk storage media; optical storage media; flash memory devices; mechanical, electrical, optical, acoustical or other forms of non-transitory signals.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as ""substantially equal" is used to indicate that they are for all practical purposes equal.

As used in this description "low power" or "lower power" or similar language refers to a comparison with the industry standard at the time of this invention.

As used in this description "8B10B" or "8B/10B" or "8b10b" or "8b/10b" or similar language refers to the same thing.

It is to be understood that in any one or more embodiments of the invention where alternative approaches or techniques are discussed that any and all such combinations as might be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a Method and Apparatus for Channel Equalization in High Speed S-RIO based Communication Systems have been described.

What is claimed is:

1. An apparatus comprising:
   means for determining a receiver decision feedback equalization coefficients;
   means for monitoring errors at said receiver;
   means for receiving an error threshold;
   means for adjusting said receiver decision feedback equalization coefficients;
   means for powering up said means for adjusting said receiver decision feedback equalization coefficients only when adjusting said receiver decision feedback equalization coefficients;
   means for powering down said means for adjusting said receiver decision feedback equalization coefficients when not adjusting said receiver decision feedback equalization coefficients; and:
   wherein means for monitoring errors at said receiver are selected from the group consisting of means for monitoring protocol errors, means for monitoring 64B/67B errors at said receiver, means for monitoring cyclic redundancy code errors and means for monitoring protocol errors and means for monitoring 8B/10B errors at said receiver, means for monitoring a lane check code word, and means for monitoring a lane check code word and means for monitoring 64B/67B errors at said receiver.

2. The apparatus of claim 1 further comprising:
   means for determining a transmitter pre-emphasis coefficients;
   means for adjusting said transmitter pre-emphasis coefficients;
   means for powering up said means for adjusting said transmitter pre-emphasis coefficients only when adjusting said transmitter pre-emphasis coefficients; and
   means for powering down said means for adjusting said transmitter pre-emphasis coefficients only when not adjusting said transmitter pre-emphasis coefficients.

3. The apparatus of claim 1 wherein said means for receiving said error threshold is means for receiving a dynamically variable error threshold.

4. The apparatus of claim 3 wherein said dynamically variable error threshold is at a time selected from the group consisting of at a power up, at a fixed time interval, at a time based on said monitored errors at said receiver, at a time determined by said transmitter, and at a time determined by a computer program.

* * * * *